United States Patent
Ejiri et al.

(10) Patent No.: US 9,859,634 B2
(45) Date of Patent: Jan. 2, 2018

(54) CONNECTION ASSEMBLY INCLUDING AN OPTICAL ELECTRONIC PART AND A SOCKET

(71) Applicant: SMK Corporation, Tokyo (JP)

(72) Inventors: Koichiro Ejiri, Kanagawa (JP); Haruhiko Kondo, Kanagawa (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 15/381,106

(22) Filed: Dec. 16, 2016

(65) Prior Publication Data
US 2017/0338574 A1  Nov. 23, 2017

(30) Foreign Application Priority Data

May 20, 2016  (JP) ................. 2016-101288

(51) Int. Cl.
| | |
|---|---|
| H01R 12/00 | (2006.01) |
| H01R 12/70 | (2011.01) |
| H01R 12/71 | (2011.01) |
| H01R 12/73 | (2011.01) |
| H01R 13/52 | (2006.01) |

(52) U.S. Cl.
CPC ....... *H01R 12/707* (2013.01); *H01R 12/7005* (2013.01); *H01R 12/716* (2013.01); *H01R 12/732* (2013.01); *H01R 13/5202* (2013.01); *H01R 13/5219* (2013.01)

(58) Field of Classification Search
CPC .. H01R 12/00; H01R 12/7076; H01R 12/716; H01R 12/7005; H01R 12/707
USPC ........................ 439/83, 620.01, 71
See application file for complete search history.

(56) References Cited

U.S. PATENT DOCUMENTS

| | | | | |
|---|---|---|---|---|
| 7,168,959 B2* | 1/2007 | Kuo | ..................... | H01R 23/662 439/607.01 |
| 7,226,318 B1* | 6/2007 | Lee | ......................... | G06K 19/07 361/737 |
| 7,261,599 B2* | 8/2007 | Li | ...................... | H01R 13/6275 439/607.01 |
| 7,435,139 B2* | 10/2008 | Yang | .................. | H01R 13/2442 439/607.01 |
| 7,594,818 B1* | 9/2009 | Asai | ................... | H01R 13/2442 439/71 |

(Continued)

FOREIGN PATENT DOCUMENTS

| | | |
|---|---|---|
| JP | 2009-110712 A | 5/2009 |
| JP | 2009-123428 A | 6/2009 |

*Primary Examiner* — Harshad C Patel

(57) ABSTRACT

A connection assembly includes an optical electronic part and a socket. A conductive pad connected to a photoelectric conversion element of the optical electronic part is oriented with imaging field of view upward, and slidably contacts a contact of the socket. The optical electronic part includes an insulating case with a flange protruding along a horizontal plane, and a conductive pad that is exposed in an outer surface parallel to the horizontal plane. The socket includes a guide portion that slidably guides the flange portion along the horizontal plane, and a contact fixed to a housing opposed to the outer surface in which the conductive pad is exposed, with a contact portion located in a movement locus of the conductive pad sliding with the flange portion along the horizontal plane. As the insulating case is operated, the contact makes sliding contact with the conductive pad to provide a self-cleaning effect.

8 Claims, 24 Drawing Sheets

(56) References Cited

U.S. PATENT DOCUMENTS

| | | | |
|---|---|---|---|
| 7,648,395 B2* | 1/2010 | Ma | H01R 12/592 |
| | | | 439/607.01 |
| 7,988,458 B2* | 8/2011 | Lin | H01R 12/57 |
| | | | 439/67 |
| 8,011,934 B2* | 9/2011 | Tu | H04M 1/0264 |
| | | | 439/67 |
| 2004/0068868 A1* | 4/2004 | Nishio | H04N 5/2253 |
| | | | 29/840 |

* cited by examiner

CONNECTION ASSEMBLY INCLUDING AN OPTICAL ELECTRONIC PART AND A SOCKET

CROSS REFERENCE TO RELATED APPLICATION

The contents of the following Japanese patent application is incorporated herein by reference, Japanese Patent Application No. 2016-101288 filed on May 20, 2016.

FIELD

The present invention relates to a connection assembly including an optical electronic part and a socket for connecting an optical electronic part including a built-in photoelectric conversion element, such as a camera module, to a socket which is fixed to a printed wiring board. More particularly, the present invention relates to a connection assembly for connecting the optical electronic part to the socket in an orientation such that a light receiving path of the built-in photoelectric conversion element is orthogonal to a flat surface of the printed wiring board.

BACKGROUND

An optical electronic part including a built-in photoelectric conversion element, such as an image sensor, has conventionally been connected to a socket fixed to a printed wiring board, and thereby connected to the printed wiring board. The optical electronic part is connected to the socket so that the imaging field of view of the photoelectric conversion element is not blocked by the printed wiring board or other parts mounted around the printed wiring board (Patent Literature 1 and Patent Literature 2). Such a connection assembly including an optical electronic part and a socket will be described below by using the socket 100 described in Patent Literature 2 as an example.

FIGS. 23 and 24 are a perspective view and a longitudinal sectional view of the socket 100. The socket 100 is a through-board socket 100 which is mounted on a printed wiring board 110 along a horizontal plane parallel to the printed wiring board 110, with a lower portion of its insulating housing 101 inserted into a mounting hole 111 formed through the printed wiring board 110. The through-board socket 100 includes the insulating housing 101, a plurality of contacts 103, a pair of side shield plates 104, 104, and a bottom shield plate 105. The insulating housing 101 includes a bottom plate portion 101a of square shape and side wall portions 101b erected upward from the four sides around the bottom plate portion 101a. The bottom plate portion 101a and the side wall portions 101b are integrally molded to form a connection insertion recess 102 of cubic shape in the insulating housing 101 so that a not-shown camera module of rectangular solid shape, serving as the optical electronic part, is mounted from above. The plurality of contacts 103 penetrate through the side wall portions 101b of the insulating housing 101. The pair of side shield plates 104, 104 covers the periphery of the side wall portions 101b. The bottom shield plate 105 covers the bottom plate portion 101a from below.

As shown in FIG. 24, each of the contacts 103 includes a fixed portion 103a, a contact portion 103b, and a connection leg portion 103c which are integrally formed in a narrow strip shape. The fixed portion 103a is fixed to the side wall portion 101b. The contact portion 103b is formed to bend in an inverted U shape from the fixed portion 103a and cantilevered along the bottom plate portion 101a. The connection leg portion 103c is formed to bend in a U shape from the fixed portion 103a and horizontally folded at the end.

The pair of side shield plates 104, 104 includes a plurality of folded spring pieces 104b and 104b' which are extended astride the side wall portions 101b and folded toward the interior of the connection insertion recess 102. Among the plurality of folded spring pieces 104b and 104b', the folded spring pieces 104b folded in the centers of the side wall portions 101b act to latch the outer side surfaces of the optical electronic part accommodated in the connection insertion recess 102 and prevent the optical electronic part from coming off upward. The folded spring pieces 104b' folded at both sides of the respective side wall portions 101b make elastic contact with the outer side surfaces of the optical electronic part accommodated in the connection insertion recess 102. The folded spring pieces 104b' thereby position the optical electronic part so that conductive pads exposed in the bottom surface of the optical electronic part come into contact with the contact portions 103b of the contacts 103 without a misalignment.

The bottom shield plate 105 is formed out of a conductive metal plate in a square shape covering the entire bottom surface of the bottom plate portion 101a. Press-in pieces erected upward at four corners of the bottom shield plate 105 are pressed into and fixed to the bottom plate portion 101a from the bottom side. The four sides around the bottom shield plate 105 are bent upward to cover the respective side surfaces of the bottom plate portion 101a. The top ends of the four sides are horizontally bent outward to form ground leg portions 105a.

A lower portion of the through-board socket 100 is accommodated in the mounting hole 111 of the printed wiring board 110. The mounting hole 111 is formed to have inner dimensions slightly greater than the outer dimensions of the bottom shield plate 105. In the accommodated state, the connection leg portions 103c of the contacts 103 horizontally protruding at the height of the flat surface of the printed wiring board 110 are soldered to a conductive pattern laid in the corresponding regions of the printed wiring board 110. The ground leg portions 104c of the side shield plates 104 and the ground leg portions 105a of the bottom shield plate 105 are soldered to a ground pattern of the printed wiring board 110. The through-board socket 100 is thereby fixed to inside the mounting hole 111 in parallel with the horizontal plane at the surface of the printed wiring board 110.

If the optical electronic part oriented with the light receiving optical path of a photoelectric conversion element perpendicularly upward is accommodated in the connection insertion recess 102 of the through-board socket 100, the conductive pads exposed in the bottom surface are electrically connected to the conductive pattern of the printed wiring board 110 via the respective contacts 103. The optical electronic part is connected to the socket 100 mounted on the printed wiring board 110 in an orientation such that the light receiving optical path is orthogonal to the horizontal plane of the printed wiring board 110.

CITATION LIST

Patent Literature

Patent Literature 1: Japanese Patent Application Laid-Open No. 2009-123428

Patent Literature 2: Japanese Patent Application Laid-Open No. 2009-110712

SUMMARY

Technical Problem

According to the conventional sockets described in the foregoing Patent Literatures 1 and 2, an optical electronic part loosely fitted to the connection insertion recess 102 from above is pressed in all directions along the horizontal plane by the large number of folded spring pieces 104b' fixed to the surrounding side wall portions 101b. The optical electronic part is thereby positioned inside the connection insertion recess 102. If horizontal external force acts on the optical electronic part or if the large number of folded spring pieces 104b' have different spring pressures, the optical electronic part can be horizontally displaced from the set position. Therefore, there has been a possibility that the light receiving optical path of the photoelectric conversion element may be deviated.

To make the optical electronic part low-profile in terms of the height from the printed wiring board, the optical electronic part is almost entirely accommodated in the connection insertion recess 102. The optical electronic part is unable to be detached unless a dedicated tool is used to press the folded spring pieces 104b serving as retaining pieces toward the side wall portions 101b to unlatch. The optical electronic part has therefore been not easily replaceable.

The contact portions of the contacts formed out of plate spring pieces protrude from the inner bottom surface of the connection insertion recess 102. The contact portions of the contacts are perpendicularly butted into elastic contact with the conductive pads exposed in the bottom surface of the insulating case of the optical electronic part. In such a structure, the contact portions of the contacts and the contact surfaces of the conductive pads will not be self-cleaned. Therefore, there has been a possibility that an oxide film or insulating substances adhering to the contact surfaces can cause poor contact between the contact portions and the conductive pads.

In particular, to make the socket mounted on the printed wiring board low-profile, the sockets described in Patent Literatures 1 and 2 have slits in the bottom plate portion 101a of the insulating housing 101. The slits are intended to avoid interference with the contacts which give downward when in contact with the conductive pads. The space in which the contact portions 103b of the contacts 103 and the conductive pads are in contact with each other is thus not able to be hermetically sealed from outside. The problem that an oxide film or insulating substances adhere to the contact surfaces to cause poor contact in the case of use in an inferior atmosphere has therefore been unavoidable.

The contact portions 103b on the free end sides of the contacts 103 are unable to be accurately positioned in the perpendicular direction in which the contact portions 103b are butted into contact with the conductive pads. The connection timing between the optical electronic part and the socket therefore cannot be detected by providing detection contacts having different contact timing with the conductive pads.

The present invention has been achieved in view of the foregoing problems. It is thus an object of the present invention to provide a connection assembly including an optical electronic part and a socket for connecting the optical electronic part to the socket without deviating the light receiving optical path of the optical electronic part.

Another object of the present invention is to provide a connection assembly including an optical electronic part and a socket in which the optical electronic part can be easily attached and detached to/from the socket for replacement.

Further another object of the present invention is to provide a connection assembly including an optical electronic part and a socket in which the connection surfaces between the conductive pads of the optical electronic part and the contact portions of the contacts of the socket are self-cleaned each time the conductive pads and the contact portions are in contact with each other, and thus, poor contact will not occur due to intervention of insulating substances.

Still another object of the present invention is to provide a connection assembly including an optical electronic part and a socket in which the contact timing between the conductive pads of the optical electronic part and the contact portions of the contacts of the socket can be accurately set.

Solution to Problem

To achieve the foregoing objects, a connection assembly including an optical electronic part and a socket according to a first aspect is a connection assembly including an optical electronic part and a socket for connecting an optical electronic part including a built-in photoelectric conversion element to a socket fixed to a printed wiring board, wherein: the optical electronic part includes an insulating case that makes the built-in photoelectric conversion element face vertically upward through an opening in a flat surface and integrally includes a flange portion protruding from a side surface at least in one direction along a horizontal plane, and a plurality of conductive pads that are electrically connected to the photoelectric conversion element and exposed in an outer surface of the insulating case, the outer surface being parallel to the horizontal plane; the socket includes a housing that is fixed to the printed wiring board along a horizontal plane parallel to the printed wiring board, a guide portion that slidably guides the flange portion along the horizontal plane, and a plurality of contacts that are mutually insulated and fixed to a connection area of the housing perpendicularly opposed to the outer surface in which the conductive pads are exposed, leg portions on one end side of the contacts being electrically connected to a conductive pattern of the printed wiring board, leg portions on the other side of the contacts being located in movement loci of the plurality of conductive pads sliding integrally with the flange portion; and the optical electronic part is connected to the socket fixed to the printed wiring board in an orientation such that the photoelectric conversion element faces upward orthogonally to the printed wiring board.

The flange portion of the optical electronic part is slidably guided along the horizontal plane by the guide portion of the socket. The light receiving optical path of the photoelectric conversion element orthogonal to the horizontal plane is therefore not deviated.

The plurality of conductive pads of the optical electronic part are exposed in the outer surface of the insulating case parallel to the horizontal plane. The flange portion integral with the insulating case is slidably guided along the horizontal plane by the guide portion of the socket, and therefore the plurality of conductive pads move horizontally. Since the contact portions of the contacts of the socket are located in the movement loci of the conductive pads moving horizontally, the conductive pads and the contact portions of the corresponding contacts make sliding contact with each other as the optical electronic part slides on.

The contact portions of the contacts fixed to the connection area can be supported in horizontally fixed positions. The contact portions can thus be located in arbitrary positions in the movement loci of the conductive pads along the horizontal plane to adjust the contact timing with the corresponding conductive pads contact by contact.

A contact between an optical electronic part and a socket according to a second aspect is configured such that: the plurality of conductive pads are exposed in any one of exposure surfaces including a flat surface and a bottom surface of the flange portion; a connection insertion recess that slidably guides the flange portion in a protruding direction of the flange portion and accommodates the flange portion so that the connection area is opposed to the exposure surface of the flange portion is formed in the housing; and the insulating case is horizontally positioned in an insertion position of the flange portion in which the conductive pads exposed in the exposure surface of the flange portion make contact with the contact portions of the corresponding contacts in the connection insertion recess.

The flange portion of the insulating case of the optical electronic part is slidably guided along the horizontal plane by the connection insertion recess of the socket. The insulating case is horizontally positioned in a sliding position in which the conductive pads make contact with the contact portions of the corresponding contacts. The light receiving optical path of the photoelectric conversion element orthogonal to the horizontal plane is therefore not deviated.

The conductive pads are exposed in the flat surface or bottom surface of the flange portion which is slidably guided by and accommodated in the connection insertion recess. The contact portions of the contacts are located in the movement loci of the conductive pads which move horizontally in the connection insertion recess. The conductive pads and the contact portions of the corresponding contacts therefore make sliding contact with each other as the optical electronic part slides on.

The contact portions of the contacts fixed to the connection area can be supported in the horizontally fixed positions. The contact portions can thus be located in arbitrary positions in the movement loci of the conductive pads along the horizontal plane in the connection insertion recess to adjust the contact timing with the corresponding conductive pads contact by contact.

Only the integral flange portion of the insulating case is accommodated in the connection insertion recess. The insulating case other than the flange portion can thus be operated to slide horizontally, whereby the flange portion can be easily inserted and removed into/from the connection insertion recess.

A connection assembly including an optical electronic part and a socket according to a third aspect is configured such that a part of the housing forming the connection insertion recess is a metal cover electrically connected to a ground pattern of the printed wiring board.

Since a part of the connection insertion recess is formed by the metal cover, the connection insertion recess itself has certain strength. Since the housing is also fixed to the printed wiring board at the location of connection between the metal cover and the ground pattern, external force is less likely to act on the locations of connection between the leg portions of the contacts and the conductive pattern of the printed wiring board.

Since a part of the connection insertion recess is formed by the grounded metal cover, the interior of the connection insertion recess where covered by the metal cover is shielded from outside.

A connection assembly including an optical electronic part and a socket according to a fourth aspect is configured such that a guide reception portion that guides the flange portion perpendicularly placed thereon to the connection insertion recess in the protruding direction of the flange portion is formed on the housing to be continuous with the connection insertion recess.

To accommodate the flange portion of the optical electronic part placed on the guide reception portion into the connection insertion recess, the flange portion has only to be placed on the guide reception unit and slid in the protruding direction of the flange portion.

A connection assembly including an optical electronic part and a socket according to a fifth aspect is configured such that: the socket further includes a first elastic seal member that is fixed to a region of the housing surrounding an entire periphery of the connection area and makes elastic contact with the exposure surface of the flange portion inserted into the connection insertion recess to sandwich the flange portion between an inner surface of the connection insertion recess opposed to the connection area and the first elastic seal member; and a space in which the conductive pads exposed in the exposure surface of the flange portion and the contact portions of the corresponding contacts are in contact with each other is hermetically sealed by the housing, the first elastic seal member, and the exposure surface of the flange portion.

If the flange portion is accommodated in the connection insertion recess, the space in which the conductive pads and the contact portions of the corresponding contacts are in contact with each other is hermetically sealed between the inner surface of the connection insertion recess to which the contacts are fixed, the first elastic seal member, and the exposure surface of the flange portion.

A connection assembly including an optical electronic part and a socket according to a sixth aspect is characterized in that: the plurality of conductive pads are exposed in a bottom surface of the insulating case, the insulating case having a closed-bottomed cylindrical shape with a center axis in a perpendicular direction; a cylindrical accommodation recess accommodating the flange portion of the insulting case is formed in the housing, the cylindrical accommodation recess being formed by a circular bottom surface portion and a cylindrical peripheral wall portion erected around the circular bottom surface portion, the circular bottom surface portion having a connection area opposed to the bottom surface of the insulating case in which the conductive pads are exposed; the flange portion is fitted and inserted into between a cover piece horizontally protruded inward from the peripheral wall portion and the circular bottom surface portion, and the insulating case is rotatably guided about the center axis of the cylindrical accommodation recess along an inner wall surface of the peripheral wall portion; and the insulating case is positioned in a rotating direction in a rotation position of the insulating case in which the conductive pads exposed in the bottom surface of the insulating case make contact with the contact portions of the corresponding contacts in the cylindrical accommodation recess.

The insulating case of the optical electronic part is rotatably guided along the horizontal plane about the center axis of the cylindrical accommodation recess, and positioned in the rotation position in which the conductive pads make contact with the contact portions of the corresponding contacts. This involves no horizontal movement, and the light receiving optical path of the photoelectric conversion element orthogonal to the horizontal plane is therefore not deviated.

The plurality of conductive pads of the optical electronic part are exposed in the bottom surface of the insulating case which is rotatably guided along the horizontal plane about the center axis of the cylindrical accommodation recess of the socket along with the flange portion. The contact portions of the contacts of the socket are located in the movement loci of the conductive pads on the circular bottom surface portion opposed to the bottom surface of the insulating case. The conductive pads and the contact portions of the corresponding contacts therefore make sliding contact with each other as the optical electronic part rotates in the cylindrical accommodation recess.

The contact portions of the contacts fixed to the connection area can be supported in the fixed positions about the center axis of the cylindrical accommodation recess. The contact portions can thus be located in arbitrary positions in the movement loci of the conductive pads rotating about the center axis to adjust the contact timing with the corresponding conductive pads contact by contact.

A connection assembly including an optical electronic part and a socket according to a seventh aspect is configured such that the peripheral wall portion and the cover piece forming the cylindrical accommodation recess are made of a single metal plate, and a leg portion at a lower end of the peripheral wall portion is electrically connected to a ground pattern of the printed wiring board.

Since the peripheral wall portion of the cylindrical accommodation recess is made of a metal cover, the cylindrical accommodation recess itself has certain strength. The housing is also fixed to the printed wiring board at the location of connection between the leg portion at the lower end of the peripheral wall portion and the ground pattern. External force is less likely to act on the locations of connection between the leg portions of the contacts fixed to the connection area of the housing and the conductive pattern of the printed wiring board.

Since the peripheral wall portion and the cover piece of the cylindrical accommodation recess are made of the grounded metal cover, the interior of the cylindrical accommodation recess where covered by the metal cover is shielded from outside.

A connection assembly including an optical electronic part and a socket according to an eighth aspect is configured such that: the socket further includes a second elastic seal member that is fixed to a region of the circular bottom surface portion surrounding an entire periphery of the connection area and makes elastic contact with the bottom surface of the insulating case in the cylindrical accommodation recess to sandwich the insulating case between the cover piece and the second elastic seal member; and a space in which the conductive pads exposed in the bottom surface of the insulating case and the contact portions of the corresponding contacts are in contact with each other is hermetically sealed between the circular bottom surface portion, the second elastic seal member, and the bottom surface of the insulating case.

If the bottom surface of the insulating case is accommodated in the cylindrical accommodation recess, the space in which the conductive pads and the contact portions of the corresponding contacts are in contact with each other is hermetically sealed between the circular bottom surface portion, the second elastic seal member, and the bottom surface of the insulating case.

Advantageous Effects of Invention

According to the invention of the first aspect, even if external force acts on the optical electronic part connected to the socket, the light receiving optical path of the built-in photoelectric conversion element does not tilt from the perpendicular direction.

The contact surfaces between the conductive pads of the optical electronic part and the contact portions of the contacts of the socket are self-cleaned each time the optical electronic part is connected to the socket. This prevents the occurrence of poor contact due to the intervention of insulating substances.

The contact timing between the conductive pads of the optical electronic part and the contact portions of the contacts of the socket can be arbitrarily set.

According to the invention of the second aspect, even if external force acts on the optical electronic part connected to the socket, the insulating case itself is positioned with respect to the horizontal direction. The light receiving optical path of the built-in photoelectric conversion element therefore will not be deviated.

The contact surfaces between the conductive pads of the optical electronic part and the contact portions of the contacts of the socket are self-cleaned each time the flange portion is slid inside the connection insertion recess. This prevents the occurrence of poor contact due to the intervention of insulating substances.

The contact portions of the contacts of the socket can be protruded to horizontally fixed positions in the connection insertion recess. The contact portions can thus be brought into contact with the conductive pads exposed in the exposure surface of the flange portion accommodated in the connection insertion recess in arbitrary contact timing.

Only the integral flange portion of the insulating case is accommodated in the connection insertion recess. The insulating case other than the flange portion can thus be operated to slide horizontally, whereby the optical electronic part can be easily attached and detached to/from the socket for replacement.

According to the invention of the third aspect, the inner wall surface of the connection insertion recess is less likely to be deformed. Even if the housing is subjected to external force by insertion or removal of the flange portion into/from the connection insertion recess, the external force is not transmitted to the solder connections between the leg portions of the contact and the conductive pattern of the printed wiring board. This precludes pattern exfoliation and the like.

The interior of the connection insertion recess can be shielded from noise entering from the direction covered by the metal cover.

According to the invention of the fourth aspect, the flange portion of the optical electronic part is guided by the guide reception portion. This facilitates the insertion and removal of the flange portion into/from the connection insertion recess.

According to the invention of the fifth aspect, a part of the flange portion accommodated in the connection insertion recess can be used to hermetically seal the conductive pads and the contact portions of the contacts from outside without entirely enclosing the optical electronic part and the socket.

The conductive pads and the contact portions of the contacts are not exposed to the outside air while the optical electronic part is connected to the socket. Even if the optical electronic part is connected to the socket in an inferior atmosphere, the contact surfaces therefore will not be eroded further and poor contact is less likely to occur.

According to the invention of the sixth aspect, even if external force acts on the optical electronic part connected to the socket, the insulating case of the optical electronic part is positioned in the rotation position about the perpendicularly-extending center axis of the cylindrical accommodation recess. This prevents the insulating case from tilting to deviate the light receiving optical path of the built-in photoelectric conversion element.

The contact surfaces between the conductive pads of the optical electronic part and the contact portions of the contacts of the socket are self-cleaned each time the insulating case is rotated inside the cylindrical accommodation recess. Poor contact due to the intervention of insulating substances is therefore less likely to occur.

The contact portions of the contacts of the socket can be protruded from the circular bottom surface portion in horizontally fixed positions inside the cylindrical connection recess. The contact portions can thus be brought into contact with the conductive pads exposed in the bottom surface of the insulating case rotating along the horizontal plane inside the cylindrical accommodation recess in arbitrary contact timing.

Only the integral flange portion of the insulating case of the optical electronic part is fitted and inserted into between the cover piece and the circular bottom surface portion. The portion of the insulating case protruding upward from the cylindrical accommodation recess can be operated to rotate to the rotation position in which the flange portion is not covered with the cover piece. The optical electronic part can thus be easily attached and detached to/from the socket for replacement.

According to the invention of the seventh aspect, the peripheral wall portion and the cover piece of the cylindrical accommodation recess are less likely to be deformed. Even if horizontal external force acts on the optical electronic part and/or the socket, large rotation moment will not occur in the electrical connections between the leg portions of the contacts and the conductive pattern of the printed wiring board. This precludes pattern exfoliation and the like.

The interior of the cylindrical recess can be shielded from noise entering from the direction covered by the metal cover.

According to the invention of the eighth aspect, the contacting space in which the conductive pads and the contact portions of the contacts are in contact with each other can be hermetically sealed from outside by using the bottom surface of the insulating case accommodated in the cylindrical accommodation recess, without entirely enclosing the optical electronic part and the socket.

The conductive pads and the contact portions of the contacts are not exposed to the outside air while the optical electronic part is connected to the socket. Even if the optical electronic part is connected to the socket in an inferior atmosphere, the contact surfaces therefore will not be eroded further and poor contact is less likely to occur.

DESCRIPTION OF EMBODIMENTS

Figure 10:
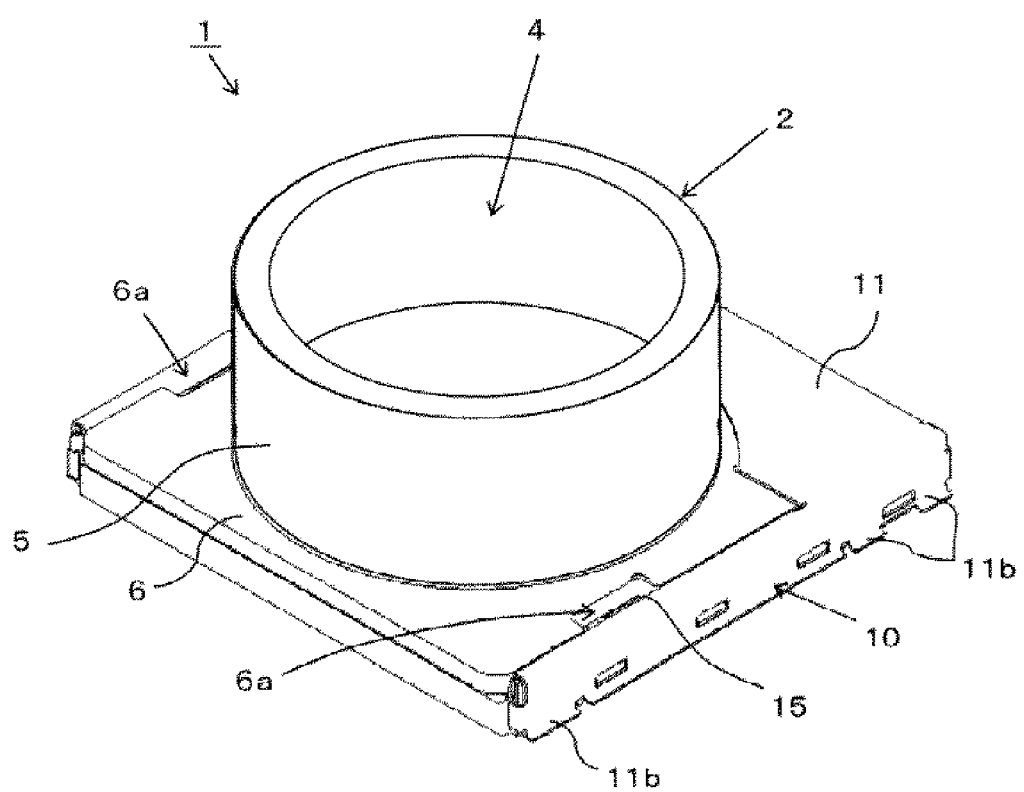
FIG. 10 is a perspective view of the connection assembly 1 including an optical electronic part and a socket, showing a state in which the optical electronic part 2 is connected to the socket 10.
Figure 11:
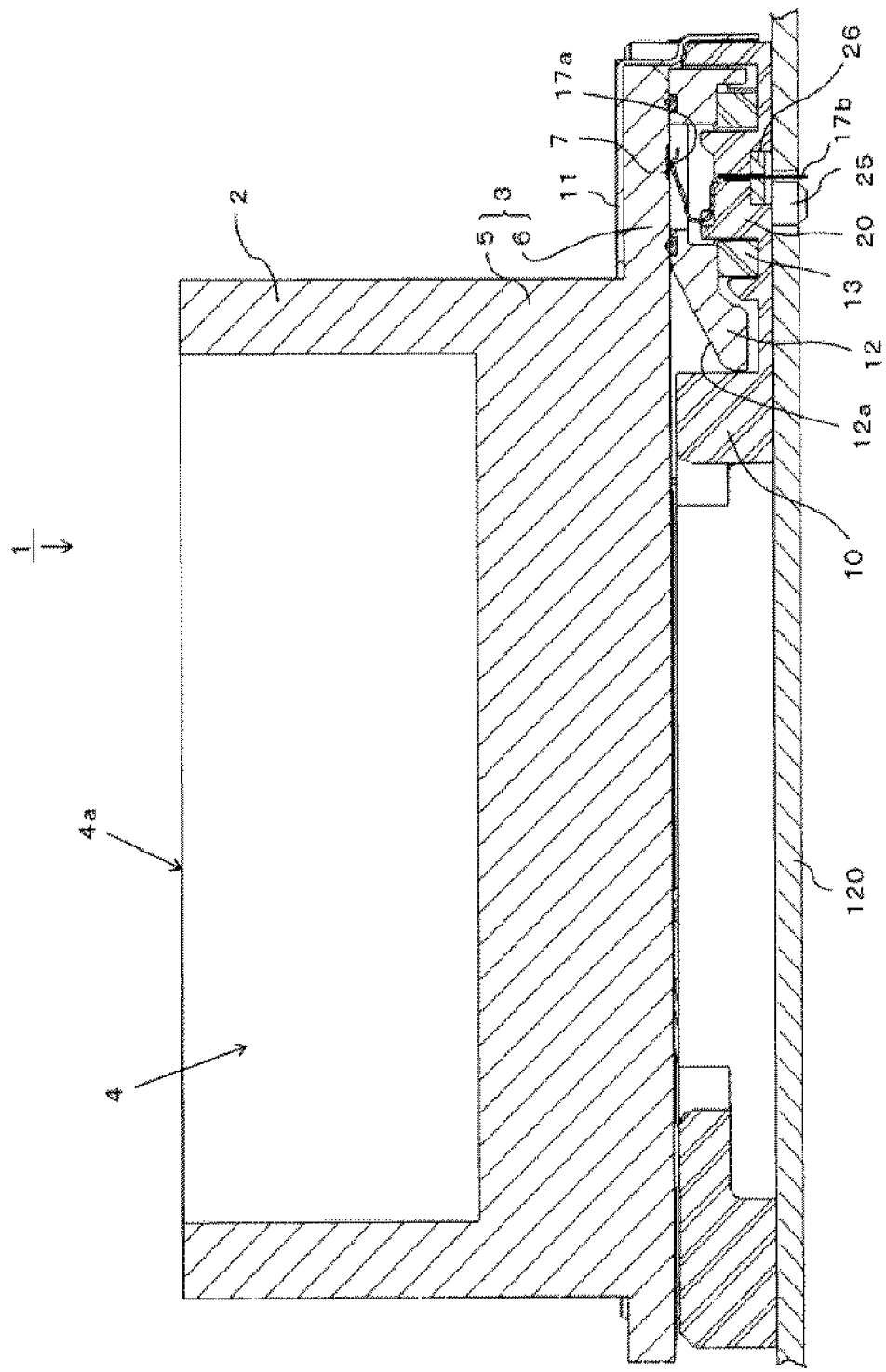
FIG. 11 is a longitudinal sectional view of FIG. 10, taken along the sliding direction of the optical electronic part 2.

A connection assembly 1 including an optical electronic part and a socket according to a first embodiment of the present invention will be described below with reference to FIGS. 1 to 12. As shown in FIG. 11, an optical electronic part 2 of the connection assembly 1 including an optical electronic part and a socket is connected to a socket 10, which is mounted on a flat surface of a printed wiring board 120, in an orientation such that its flat surface is parallel to that of the printed wiring board 10. In the following description of various portions of the optical electronic part 2 and the socket 10, a plane parallel to the flat surface of the printed wiring board 120 will be referred to as a horizontal plane. The rightward direction of FIG. 11 will be referred to as forward, the leftward direction as backward, and the vertical direction of FIG. 11 as a vertical direction.

Figure 1:
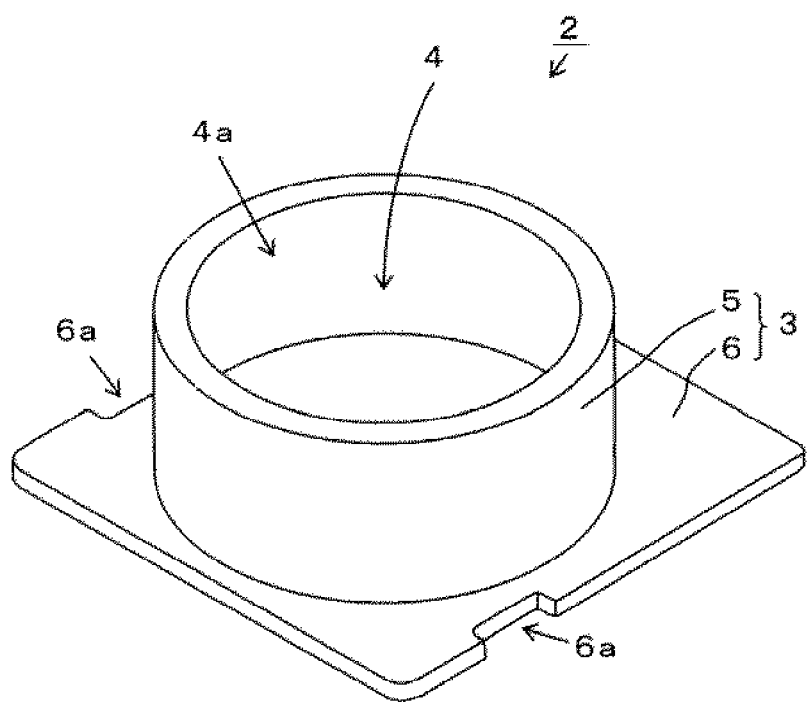
FIG. 1 is a perspective view of an optical electronic part 2 of a connection assembly 1 including an optical electronic part and a socket according to a first embodiment of the present invention, with an internal structure of the optical electronic part 2 omitted.
Figure 2:
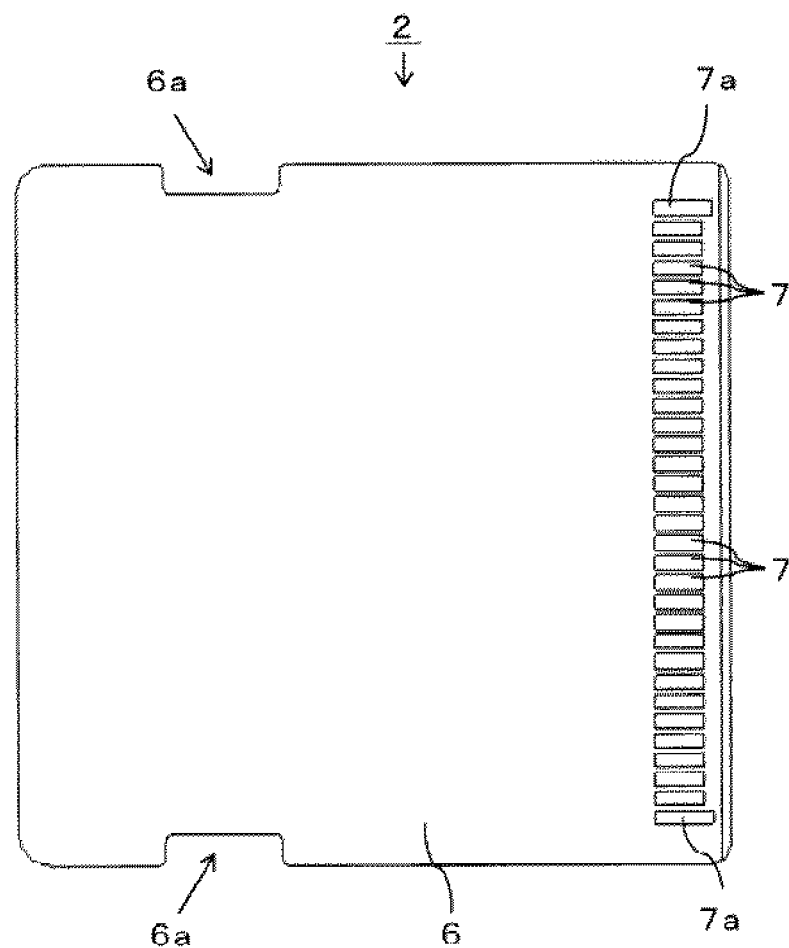
FIG. 2 is a bottom view of the optical electronic part 2.
Figure 3:
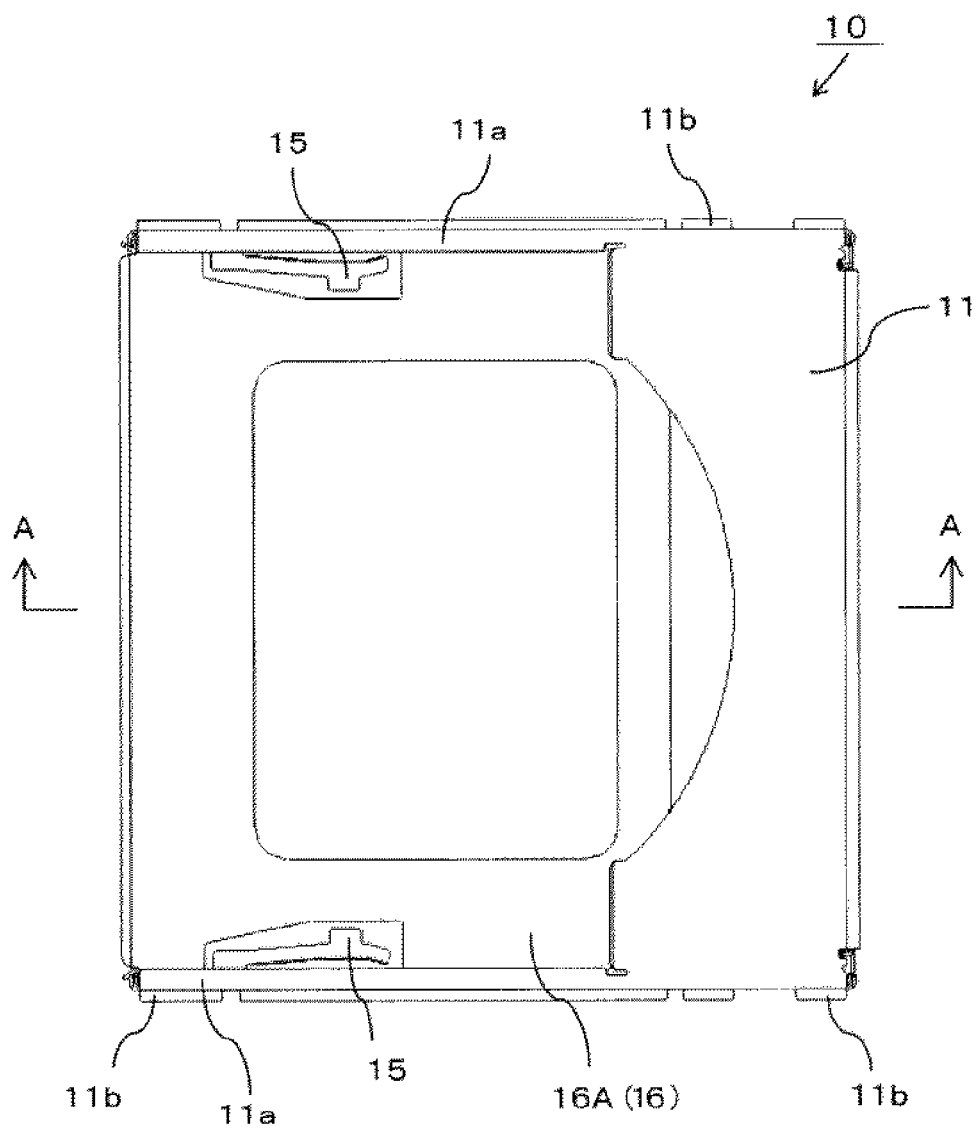
FIG. 3 is a plan view of a socket 10 of the connection assembly 1 including an optical electronic part and a socket according to the first embodiment of the present invention.
Figure 4:
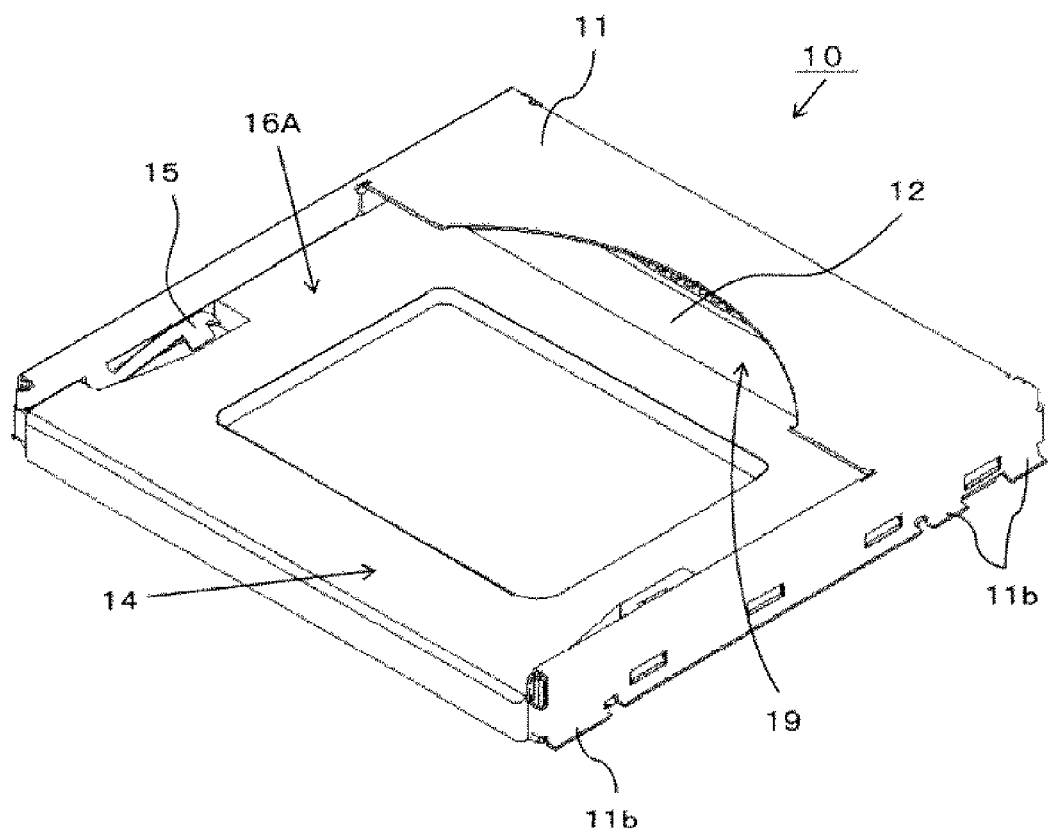
FIG. 4 is a perspective view of the socket 10.
Figure 5:
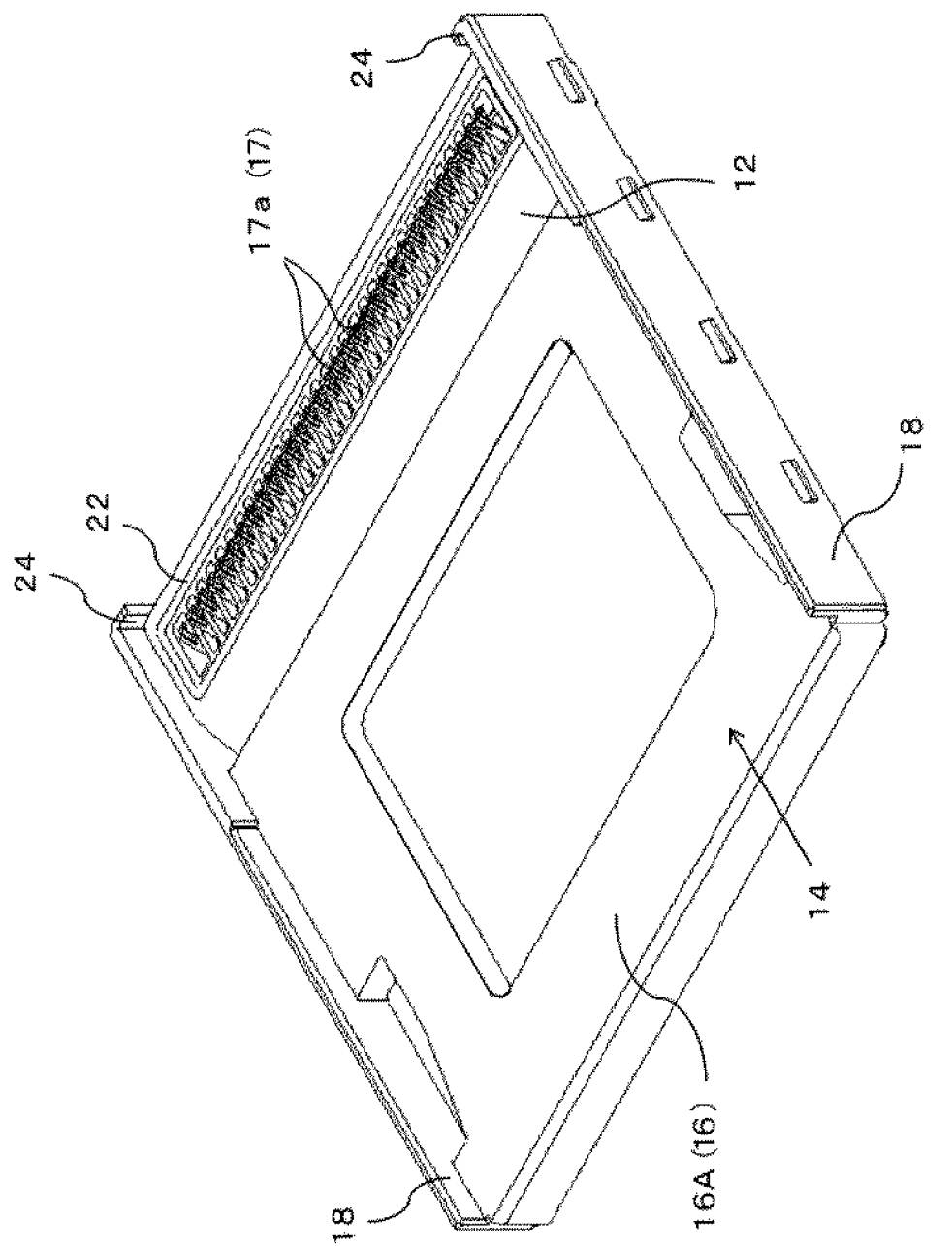
FIG. 5 is a perspective view of the socket 10 with a metal cover 11 removed.

The optical electronic part 2 is a module in which a photoelectric conversion element, such as a CCD and CMOS sensors, and optical components, such as a filter and a lens arranged on a light receiving optical path thereof, are built in an insulating case 3. As shown in FIGS. 1 and 2, the insulating case 3 of the optical electronic part 2 includes a cylindrical portion 5 and a flange portion 6. The cylindrical portion 5 has a cylindrical accommodation chamber 4 formed in its flat surface. The flange portion 6 is continuously provided on the lower end of the cylindrical portion 5 along the horizontal plane. The photoelectric conversion element and optical components (all of which are omitted in the diagrams) are accommodated in the cylindrical accommodation chamber 4. The photoelectric conversion element accommodated in the cylindrical accommodation chamber 4 faces perpendicularly upward through a window hole 4a of the cylindrical accommodation chamber 4, with an imaging field of view over the optical electronic part 2. The accommodating portion of the insulating case 3 accommodating the photoelectric conversion element and the optical components is configured as the cylindrical portion 5 of cylindrical shape. Such a configuration minimizes the size of the insulating case 3 in which a lens having a circular outline is arranged in the light receiving optical path.

The flange portion 6 of the insulating case 3 is formed to have a rectangular outline with the front-to-rear direction as its longitudinal direction. As shown in FIG. 2, the flange portion 6 protrudes forward from the cylindrical portion 5. A large number of conductive pads 7, 7, . . . connected to the photoelectric conversion element are exposed in the bottom surface of the flange portion 6 in a row in a lateral direction. Of these conductive pads 7, the ones at both left and right sides are connection detection conductive pads 7a, 7a. The front ends of the connection detection conductive pads 7a, 7a are exposed up to slightly forward than the other conductive pads 7. Engagement recesses 6a, 6a for a pair of engagement pieces 15, 15 to be described later on the socket 10 side to be engaged with, respectively, are formed in the left and right side surfaces of the flange portion 6.

Figure 6:
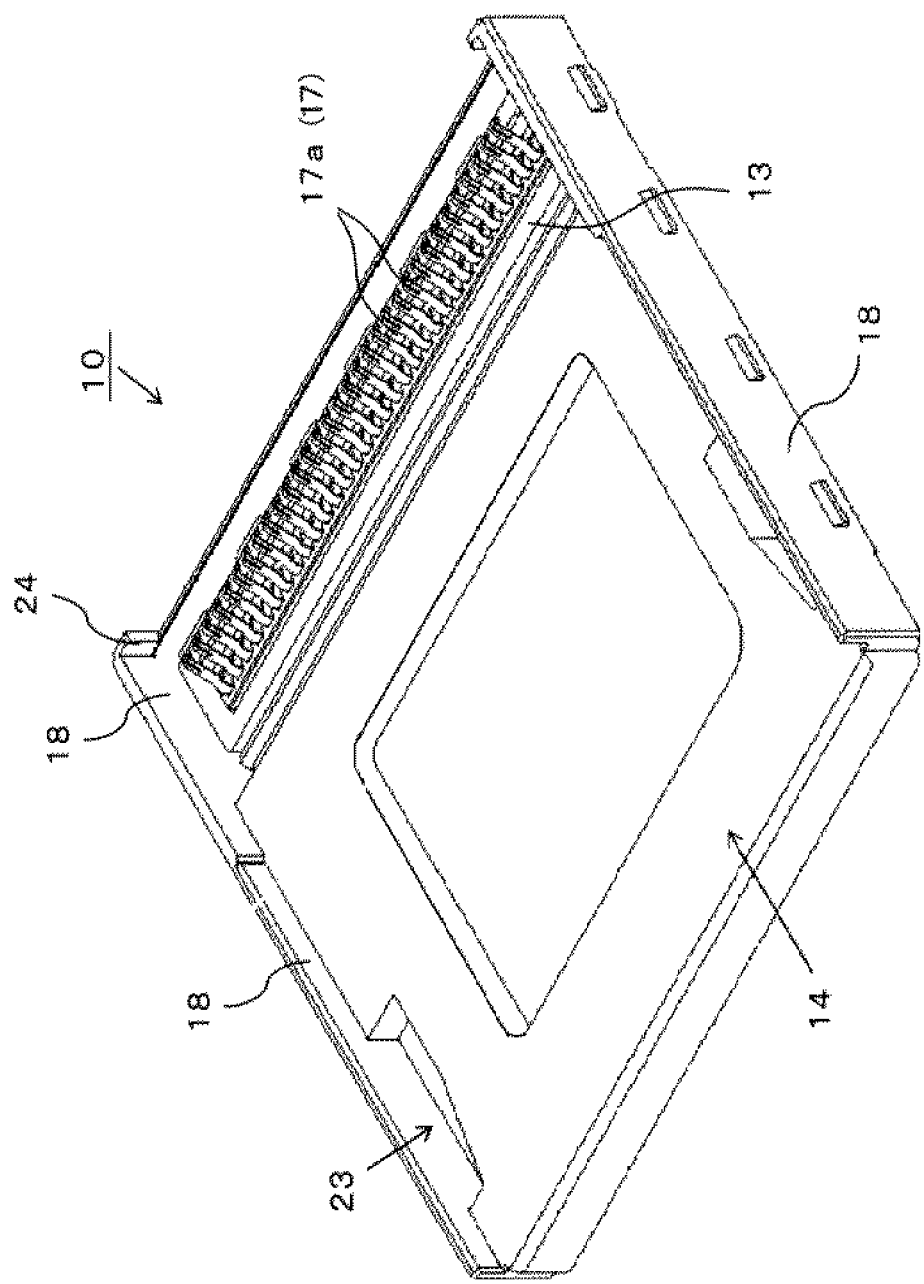
FIG. 6 is a perspective view of the socket 10 with the metal cover 11 and an upper elastic ring frame unit 12 removed.

The socket 10 includes an insulating plate 16, a metal cover 11 which covers a front portion of the insulating plate 16 from above, and a large number of contacts 17 which are passed through and fixed to the insulating plate 16. The insulating plate 16 and the metal cover 11 constitute a housing of the socket 10 which is mounted on the flat surface of the printed wiring board 120 along the horizontal plane. As shown in FIG. 6, the insulating plate 16 is formed in a flat rectangular plate shape. Guide walls 18, 18 for slidably guiding the flange portion 6 of the optical electronic part 2 therebetween in the front-to-rear direction are erected along the left and right sides of the insulating plate 16. A rear portion of the insulating plate 16 has a through hole and is thereby formed in a rectangular frame shape. The rear portion constitutes a part reception area 16A on which the flange portion 6 of the optical electronic part 2 is placed from above. A front portion of the insulating plate 16 serves as a connection area 16B in which contact portions 17a of the large number of contacts 17 are protruded upward. The part reception area 16A of the insulating plate 16 and the guide walls 18, 18 on both sides constitute a guide reception portion 14 which guides the flange portion 6 of the optical electronic part 2 placed from above in the front-to-rear direction. The connection area 16B and the metal cover 11 to be described later constitute a connection insertion recess 19 into/from which a front portion of the flange portion 6 can be freely inserted and removed in the front-to-rear direction. Clearance grooves 23, 23 for avoiding interference with the pair of engagement pieces 15, 15 are formed in both the left and right sides of the part reception area 16A.

Figure 7:
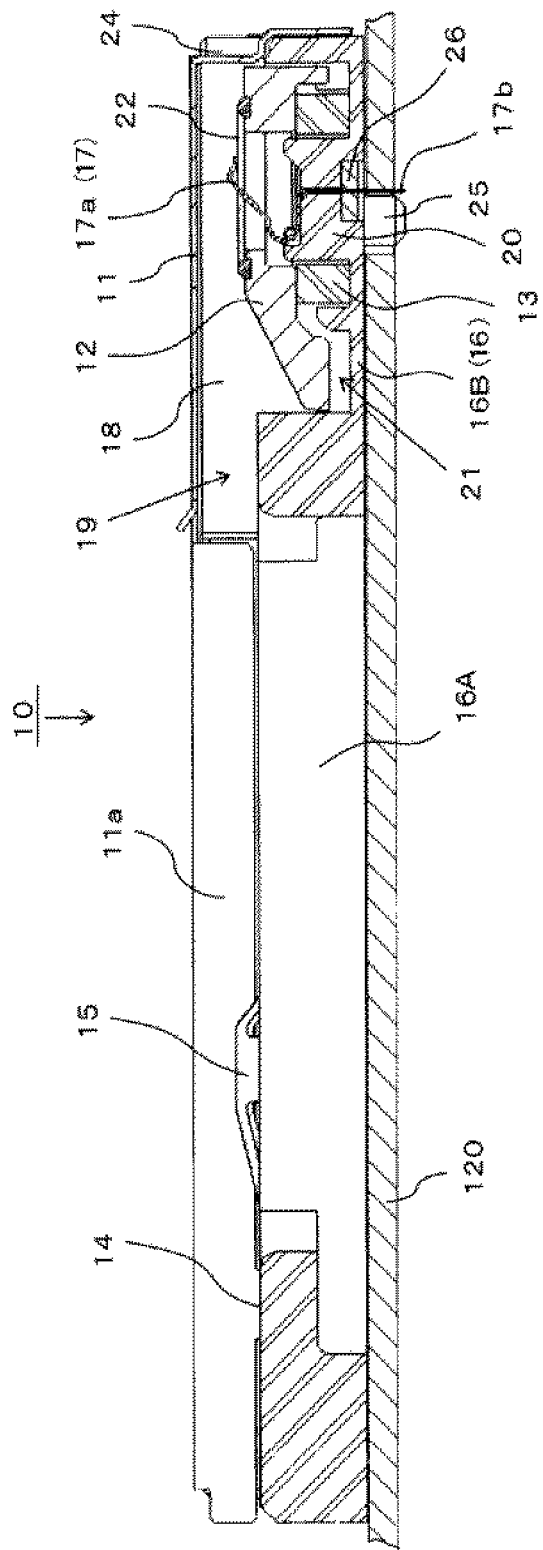
FIG. 7 is a longitudinal sectional view taken along the line A-A of FIG. 3 in a sliding direction of the optical electronic part 2.

As shown in FIG. 7, the connection area 16B of the insulating plate 16 is formed to be thinner than the part reception area 16A behind. A rib 20 for supporting the large number of contacts 17 is protruded upward in the center of the connection area 16B along the lateral direction, whereby a seal accommodation recess 21 of rectangular shape is formed around the rib 20. A lower elastic ring frame unit 13 and an upper elastic ring frame unit 12 both made of synthetic rubber are vertically stacked and arranged in the seal accommodation recess 21. A rear flat surface of the upper elastic ring frame unit 12 is formed as a flange reception surface 12a which slopes upward to the front. When in contact with the flange portion 6 moving forward, the flange reception surface 12a descends and functions to compress the lower elastic ring frame unit 13.

A rectangular ring seal 22 is further embedded in the flat surface of the upper elastic ring frame unit 12, around an opening through which the contacts 17 are passed. The rectangular ring seal 22 is embedded except a curved upper portion thereof.

The connection area 16B of the insulating plate 16 is covered from above with the metal cover 11 which is formed by bending a conductive metal plate. The connection insertion recess 19 is thereby formed which accommodates the front portion of the flange portion 6 of the optical electronic part 2 in a freely insertable and removable manner in the front-to-back direction. The perpendicular distance between the rectangular ring seal 22 and the metal cover 11 inside the connection insertion recess 19 is smaller than the thickness of the flange portion 6. The flange portion 6 therefore compresses the lower elastic ring frame unit 13, the upper elastic ring frame unit 12, and the rectangular ring seal 22 while being inserted into the connection insertion recess 19. A pair of stopper walls 24, 24 is provided on the front end of the insulating plate 16. The stopper walls 24, 24 are continuously formed inward on the front ends of the left and right guide walls 18, 18. The stopper walls 24, 24 prevent the flange portion 6 of the optical electronic part 2 inserted forward into the connection insertion recess 19 from coming off forward.

The metal cover 11 constituting the top surface of the connection insertion recess 19 has a pair of arm portions 11a, 11a which cover the left and right guide walls 18, 18 from above, respectively. The arm portions 11a, 11a are integrally and continuously formed on the metal cover 11 to extend backward. The pair of arm portions 11a, 11a reinforces the narrow guide walls 18, 18 to not be deformed easily. Ground leg portions 11b, 11b bent outward along the bottom surface of the insulating plate 16 in front and rear positions are soldered to a not-shown ground pattern of the printed wiring board 120. The socket 10 is thereby firmly fixed to the flat surface of the printed wiring board 120. The pair of engagement pieces 15, 15 is integrally cantilevered on the front inner sides of the respective arm portions 11a, 11a to extend over the clearance grooves 23, 23. The pair of engagement pieces 15, 15 protrudes in positions in which the engagement pieces 15, 15 fit into the engagement recesses 6a of the flange portion 6 when the flange portion 6 is in a sliding position inside the connection insertion recess 19 where conductive pads 7 to be described later and the connection portions 17a of the corresponding contacts 17 are in contact with each other. The engagement of the engagement pieces 15, 15 with the engagement recesses 6a positions the flange portion 6 in the sliding position in the front-to-rear direction.

The large number of contacts 17 are fixed to the rib 20 of the insulating plate 16 at regular insulating distances in the lateral direction. As shown in FIG. 7, the contact portions 17a folded obliquely upward and forward from the flat surface of the rib 20 are passed through the opening of the upper elastic ring frame unit 20 and located in the connection insertion recess 19. The contact portions 17a of the large number of contacts 17 protrude into the movement loci of the respective corresponding conductive pads 7 which slide in the front-to-rear direction in the connection insertion recess 19 along with the flange portion 6. The contact portions 17a make elastic contact from below with the corresponding conductive pads 7 exposed in the bottom surface of the flange portion 6 positioned in the sliding position.

As shown in FIG. 7, the socket 10 includes a boss 25 perpendicularly provided on the bottom surface of the insulating plate 16. The boss 25 is inserted through a positioning hole 120a of the printed wiring board 120, whereby the socket 10 is positioned on the flat surface of the printed wiring board 120. In the positioned state, leg portions 17b of the contacts 17 protruding downward from the rib 20 are passed through through holes in the printed wiring board 120 and soldered to a not-shown corresponding signal pattern formed around. The foregoing ground leg portions 11b of the metal cover 11 are soldered to the ground pattern. The socket 10 is thereby mounted on the printed wiring board 120. A hermetic seal 26 for making close contact between the peripheries of the leg portions 17b of the contacts 17 and the insulating plate 16 is elastically attached to the region where the leg portions 17b of the contacts 17 protrude from the bottom surface of the insulating plate 16. The hermetic seal 26 shields the gaps between the rib 20 and the leg portions 17b from outside.

Figure 8:
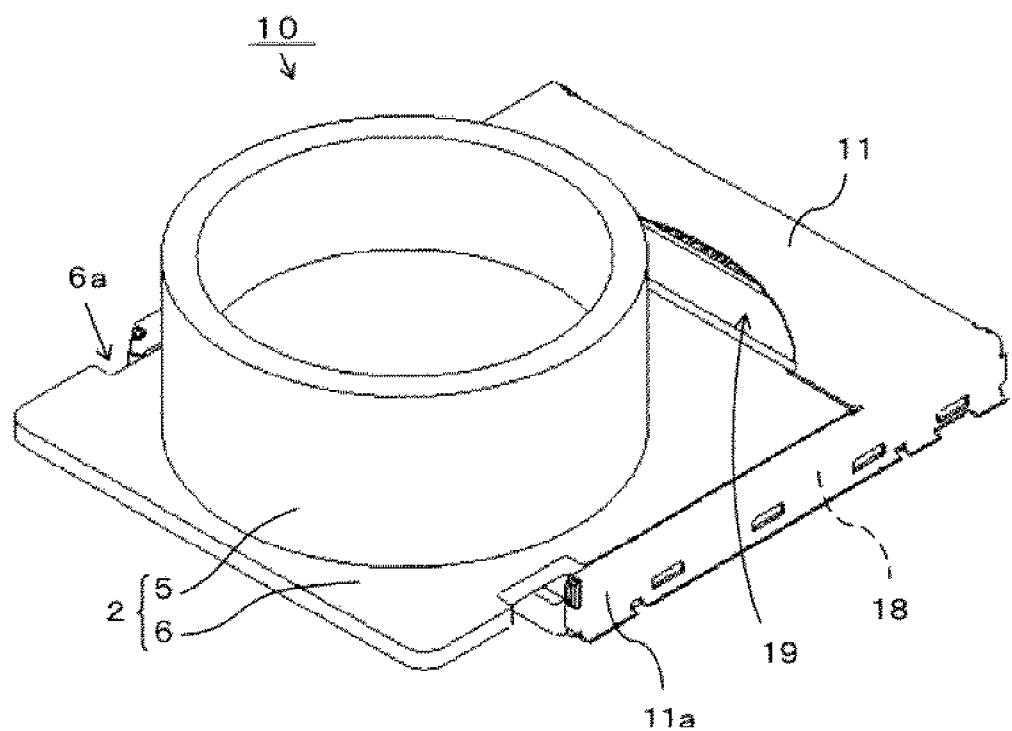
FIG. 8 is a perspective view of the connection assembly 1 including an optical electronic part and a socket, showing a state in which the optical electronic part 2 is placed on a guide reception portion 14 of the socket 10 from above.
Figure 9:
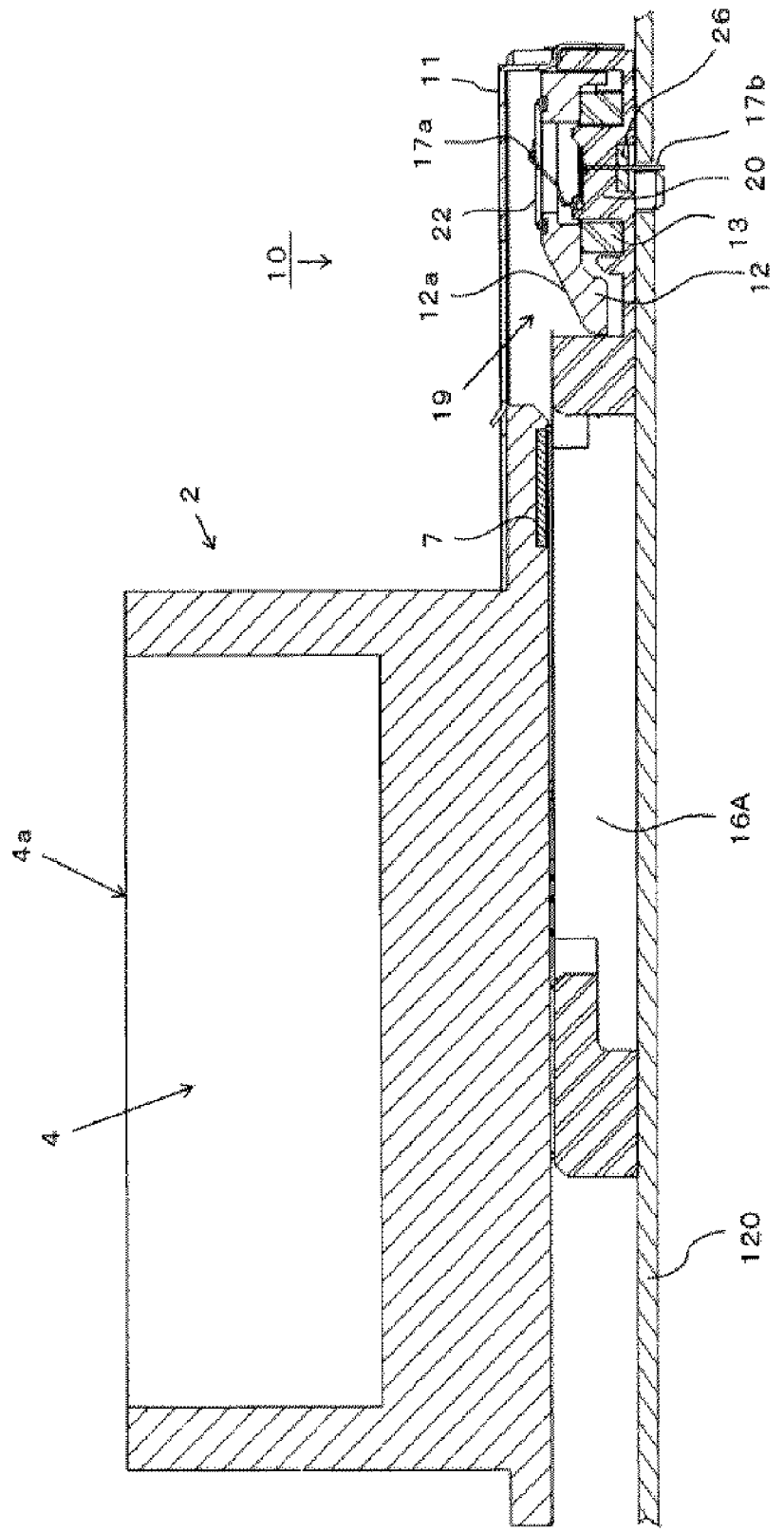
FIG. 9 is a longitudinal sectional view of FIG. 8, taken along the sliding direction of the optical electronic part 2.

To connect the optical electronic part 2 to the socket 10 mounted on the printed wiring board 120, as shown in FIGS. 8 and 9, the flange portion 6 of the optical electronic part 2 is placed on the part reception area 16A of the socket 10 from above, with the side where the conductive pads 7 are exposed in the bottom surface forward. The flange portion 6 is then slid forward along the guide walls 18 on both the left and right sides and inserted into the connection insertion recess 19.

Figure 12:
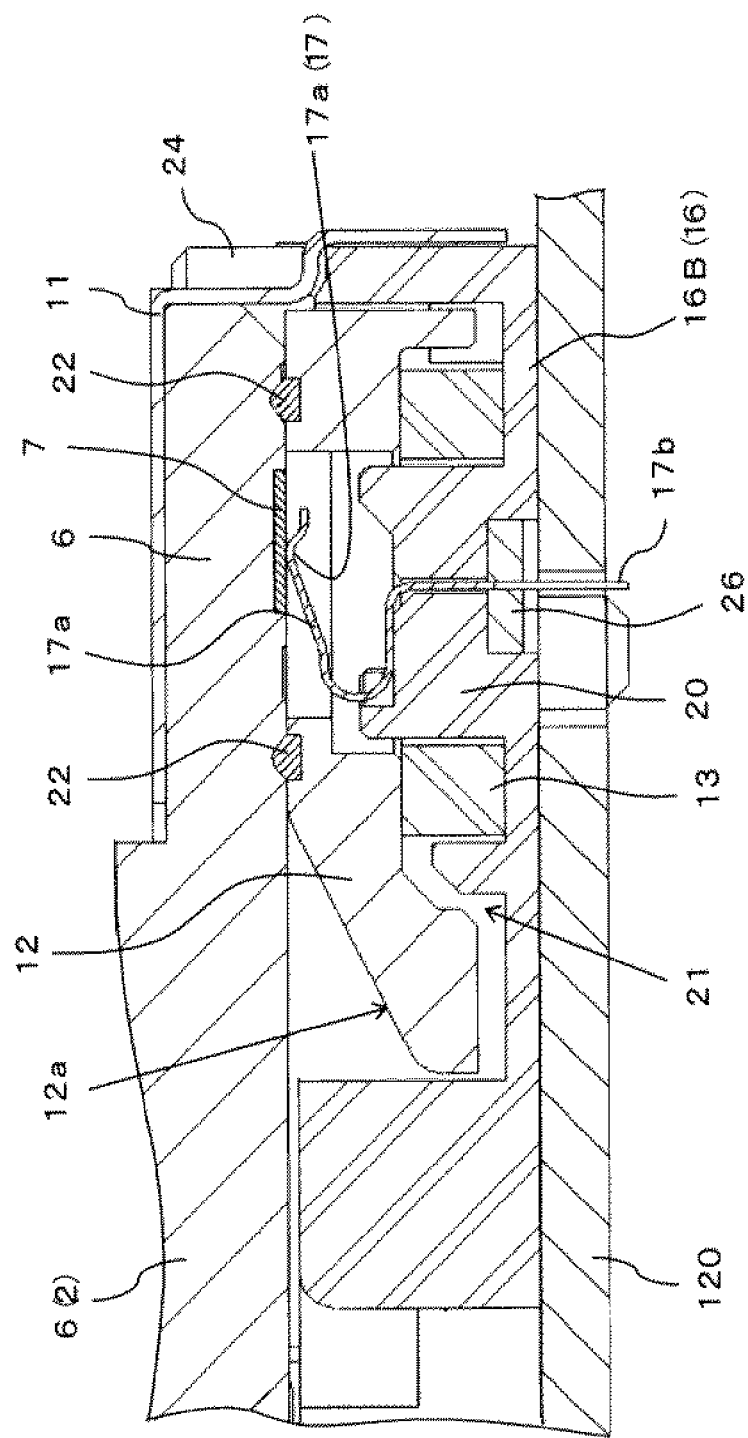
FIG. 12 is an enlarged longitudinal sectional view of essential parts of FIG. 11.

If the flange portion 6 is slid forward in the connection insertion recess 19, the front end of the flange portion 6 comes into contact with the flange reception surface 12a and presses down the upper elastic ring frame unit 12 and the lower elastic ring frame unit 13. As shown in FIGS. 10 to 12, if the flange portion 6 is further inserted up to the sliding position in the connection insertion recess 19 beyond the rectangular ring seal 22, the pair of engagement pieces 15, 15 is engaged with the engagement recesses 6a of the flange portion 6. The sliding of the flange portion 6 in the front-to-back direction is thereby restricted. Suppose that the contact portions 17a of all the contacts 17 are located in the same position in the front-to-rear direction. The pair of connection detection conductive pads 7a, 7a on both sides is electrically connected to the contact portions 17a of the corresponding contacts 17 immediately before the flange portion 6 is slid to the sliding position. Subsequently, the contact portions 17a of the contacts 17 corresponding to all the other conductive pads 7 make elastic contact from below for electrical interconnection. The timing of attachment and detachment of the optical electronic part 2 to/from the socket 10 can thus be detected from the electrical connection of the pair of connection detection conductive pads 7a, 7a with the contact portions 17a of the corresponding contacts 17.

With the flange portion 6 in the sliding position, the upper elastic ring frame unit 12, the lower elastic ring frame unit 13, and the rectangular ring seal 22 are compressively deformed to sandwich the flange portion 6 inserted in the connection insertion recess 19 between the rectangular ring seal 22 and the metal cover 11. The rectangular ring seal 22 elastically makes close contact with the bottom surface of the flange portion 6. As a result, the contacting space in which the large number of conductive pads 7 and the contact portions 17a of the corresponding contacts 17 are in contact with each other is surrounded and hermetically sealed from outside by the bottom surface of the flange portion 6, an elastic seal member formed by stacking the upper elastic ring frame unit 12, the lower elastic ring frame unit 13, and the rectangular ring seal 22, and the flat surface of the insulating plate 16.

With the flange portion 6 positioned in the sliding position, the photoelectric conversion element built in the optical electronic part 2 is electrically connected to the signal pattern of the printed wiring board 120 via the conductive pads 7 and the contacts 17. With the optical electronic part 2 and the socket 10 connected in such a sliding position, the photoelectric conversion element of the optical electronic part 2 faces upward in the perpendicular direction orthogonal to the flat surface of the printed wiring board 120, and photoelectrically converts an image with the imaging field of view upward.

To detach the optical electronic part 2 in connection with the socket 10, the flange portion 6 in the sliding position is pulled out backward against the elasticity of the engagement pieces 15 engaged with the engagement recesses 6a. The engagement recesses 6a and the engagement pieces 15 are thereby disengaged, and the flange portion 6 is moved back to the part reception area 16A and then pulled up for removal. In such a manner, the optical electronic part 2 can be easily attached and detached to/from the socket 10. Various different types of optical electronic parts 2 can thus be easily replaced according to the intended use.

In the foregoing embodiment, the optical electronic part 2 is attached and detached to/from the socket 10 by being slid straight in the horizontal direction. However, an optical electronic part 31 may be attached and detached to/from a socket 40 by being rotated about a perpendicular axis. A connection assembly 30 including an optical electronic part and a socket according to such a second embodiment of the present invention will be described. Like the first embodiment, as shown in FIG. 21, the optical electronic part 31 of the connection assembly 30 is connected to the socket 40, which is mounted on the flat surface of the printed wiring board 120, in an orientation such that its flat surface is parallel to that of the printed wiring board 120. Various portions of the connection assembly 30 including an optical electronic part and a socket will be described below with reference to FIGS. 13 to 22. In the following description, a plane parallel to the flat surface of the printed wiring board 120 will be referred to as a horizontal plane, and the vertical direction of FIG. 21 as a vertical direction.

Figure 13:
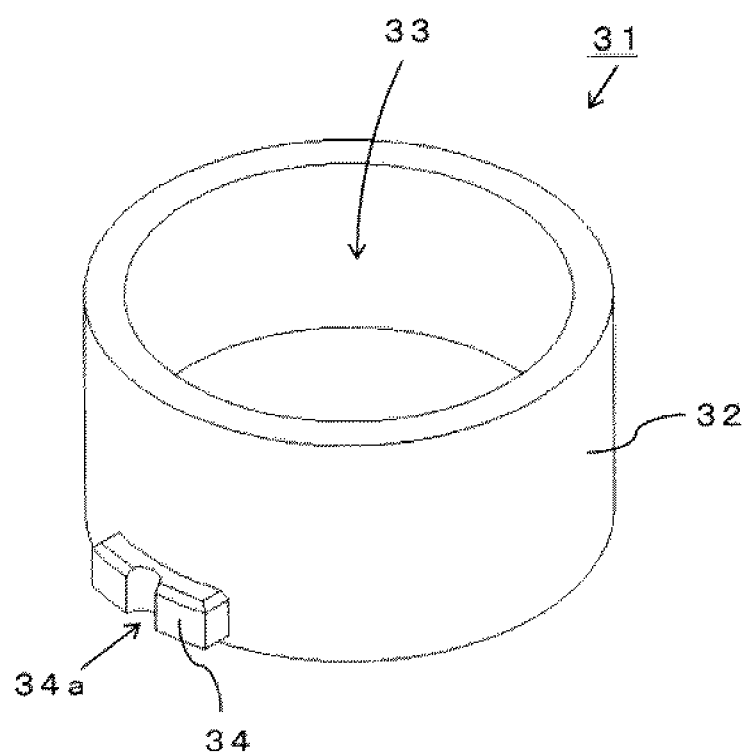
FIG. 13 is a perspective view of an optical electronic part 31 of a connection assembly 30 including an optical electronic part and a socket according to a second embodiment of the present invention.
Figure 14:
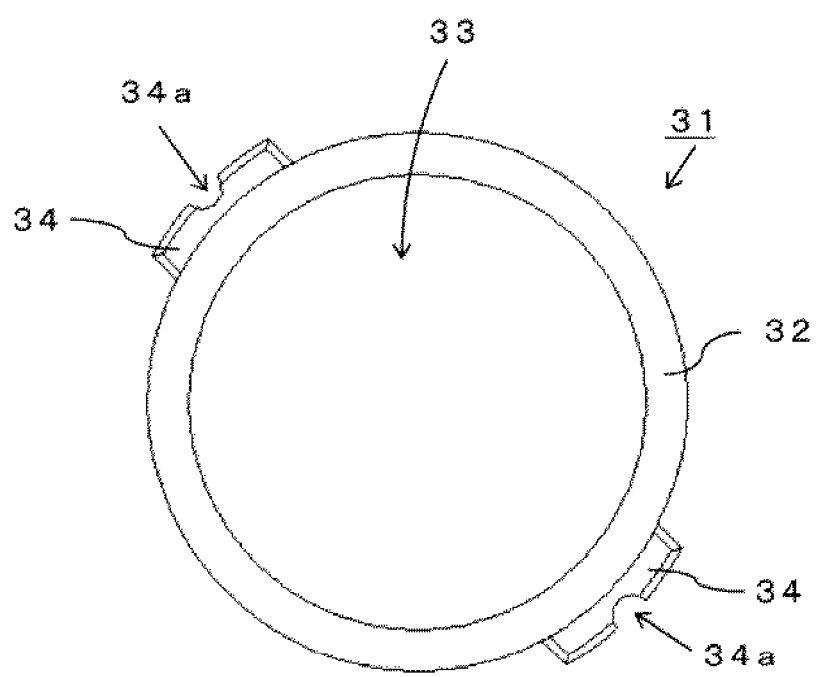
FIG. 14 is a plan view of the optical electronic part 31 with its internal structure omitted.
Figure 15:
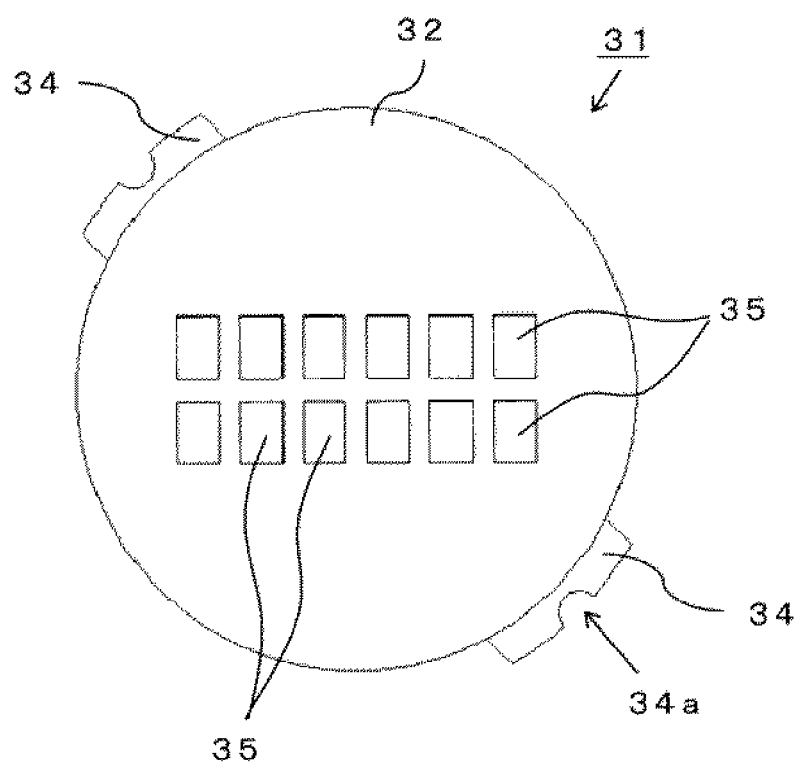
FIG. 15 is a bottom view of the optical electronic part 31.

As shown in FIGS. 13 to 15, the optical electronic part 31 is a module which includes a closed-bottomed cylindrical insulating case 32 made of an insulating synthetic resin. A photoelectric conversion element and optical components (all of which are omitted in the drawings) are accommodated in a cylindrical accommodation chamber 33 which is formed in a flat surface of the insulating case 32. The photoelectric conversion element accommodated in the cylindrical accommodation chamber 33 faces perpendicularly upward through an opening 33a of the cylindrical accommodation chamber 33, with an imaging field of view over the optical electronic part 31.

A pair of flange portions 34, 34 is horizontally protruded from the lower end of the cylindrical outer side surface of the insulating case 32 at intervals of 180° about the center axis of the cylinder. The outer side surfaces of the flange portions 34 are formed by a curved surface having approximately the same curvature as that of the curved inner wall surface of a cylindrical peripheral wall portion 46a of the socket 40 to be described later. The insulating case 32 is thus rotatably guided by the cylindrical peripheral wall portion 46a about the center axis thereof. Engagement recesses 34a for engagement protrusions 44 protruded from the inner wall surface of the cylindrical peripheral wall portion 46a to be engaged with are formed in the centers of the curved outer side surfaces of the respective flange portions 34. The engagement of the engagement protrusions 44 with the engagement recesses 34a restricts the rotation of the optical electronic part 31 about the perpendicular center axis, and positions the optical electronic part 31 in a sliding position which is a predetermined rotation position.

As shown in FIG. 15, a large number of conductive pads 35, 35, . . . connected to the photoelectric conversion element are exposed in the circular-outlined bottom surface of insulating case 32. The conductive pads 35, 35, . . . are exposed in two rows on both sides of a straight line that passes through the center of the bottom surface.

The socket 40 includes a disc-shaped insulating plate 45 made of a synthetic resin, a cylindrical metal case 46 which is erected upward from the circular periphery of the insulating plate 45, and a large number of contacts 47 which are passed through and fixed to the insulating plate 45. The insulating plate 45 and the metal case 46 constitute a housing of the socket 40 which is mounted on the flat surface of the printed wiring board 120 along the horizontal plane. A cylindrical accommodation recess 43 into which the insulating case 32 of the optical electronic part 31 is rotatably accommodated from above is formed inside the housing. A cylindrical peripheral wall portion 46a of the metal case 46 has an inner diameter slightly greater than the outer diameter across the pair of flange portions 34, 34 of the optical electronic part 31. The optical electronic part 31 is thus guided by the inner wall surface of the cylindrical peripheral wall portion 46a to rotate inside the cylindrical accommodation recess 43 about the center axis of the cylindrical peripheral wall portion 46a.

Figure 18:
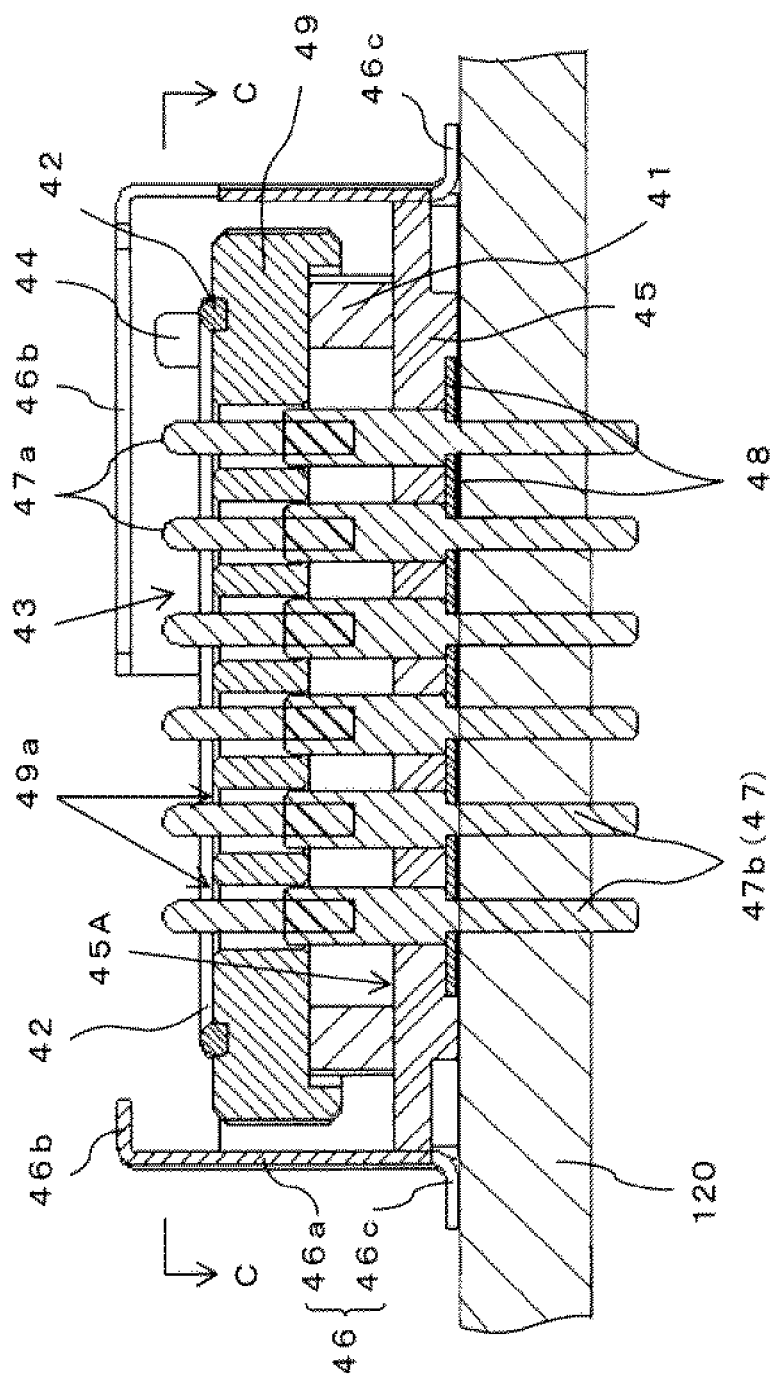
FIG. 18 is a cross-sectional view of the socket 40, taken along the line B-B of FIG. 17.
Figure 19:
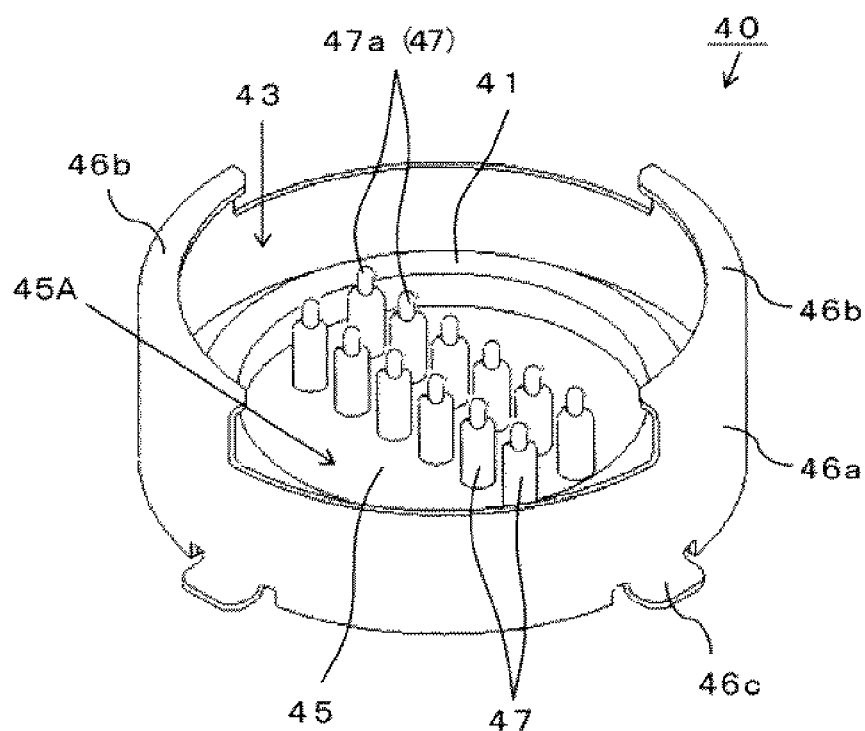
FIG. 19 is a perspective view of the socket 40 with an insulator 49 removed.

In the cylindrical accommodation recess 43, the flat surface of the insulating plate 45 serves as a connection area 45A which is perpendicularly opposed to the bottom surface of the insulating case 32 in which the conductive pads 35 are exposed. The large number of contacts 47 are arranged in respective positions of the connection area 45A to which the large number of conductive pads 35, 35, . . . are opposed when the optical electronic part 31 is in the sliding position. The contacts 47 are passed through and fixed to the insulating plate 45 at regular insulating distances. As shown in FIG. 18, a cylindrical elastic seal 41 is provided on the insulating plate 45 to surround the connection area 45A in which the large number of contacts 47 are planted. A disc-like insulator 49 is further placed over the connection region 45A. The insulator 49 is biased upward by the cylindrical elastic seal 41. The insulator 49 has a large number of through holes 49a into which the large number of contacts 47 are loosely inserted, respectively. If the insulator 49 is pressed down by the optical electronic part 31 accommodated in the cylindrical accommodation recess 43, contact portions 47a to be described later of the contacts 47 relatively protrude upward from the through holes 49a.

A ring seal 42 having a circular cross section is further embedded in the flat surface of the insulator 49 to surround the through holes 49a into which the large number of contacts 47 are loosely inserted. The ring seal 42 is embedded except an upper portion thereof.

Each contact 47 includes a contact main body 47b which is passed through and fixed to the insulating plate 45, and a contact pin (contact portion) 47a which is vertically movably attached in a state of being biased to above the contact main body 47. The contact pin 47a is inserted through a through hole 49a of the insulator 49 and located in the cylindrical accommodation recess 43. The contact portions 47a of the plurality of contacts 47 thus protrude into the movement loci of the conductive pads 35 rotating about the center axis of the insulating case 32 in the cylindrical accommodation recess 43, respectively. The contact portions 47a make elastic contact from below with the corresponding conductive pads 35 exposed in the bottom surface of the insulating case 32 positioned in the sliding position.

The portions of the contact main bodies 47b passed through and protruded below the insulating plate 45 serve as leg portions to be soldered to a corresponding signal pattern of the printed wiring board 120. A hermetic seal 48 is elastically attached between the peripheries of the leg portions and the insulating plate 45, whereby the gaps in the insulating plate 45 through which the leg portions are passed is hermetically sealed.

Figure 16:
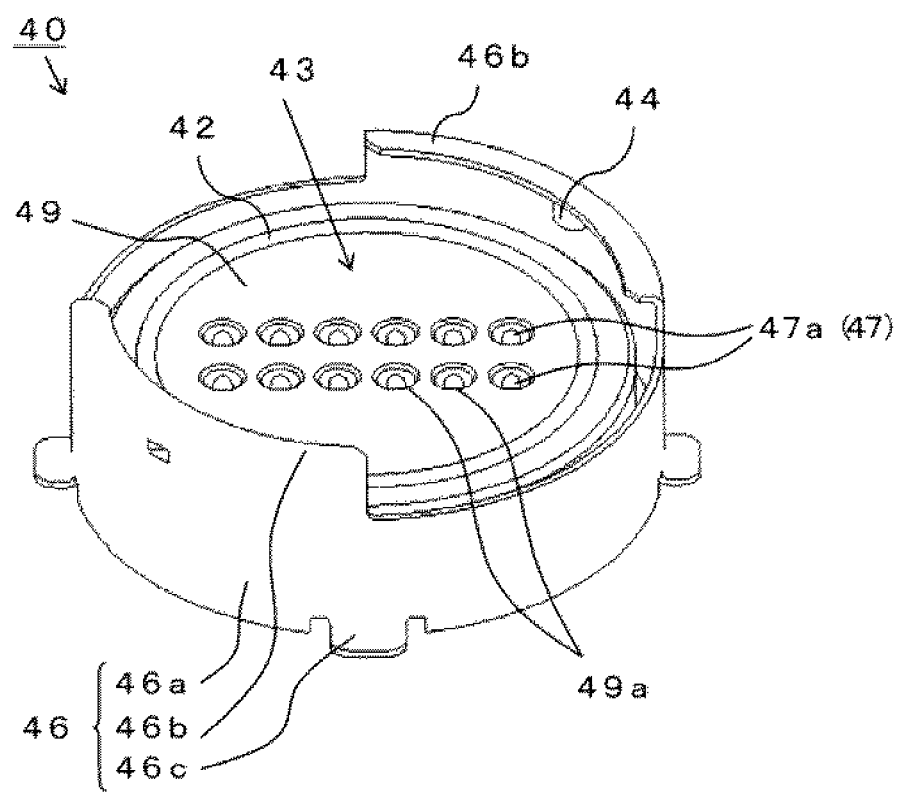
FIG. 16 is a perspective view of a socket 40 of the connection assembly 30 including an optical electronic part and a socket according to the second embodiment of the present invention.

As shown in FIG. 16, a pair of sector cover pieces 46b, 46b is integrally formed on the top end of the cylindrical peripheral wall portion 46a of the metal case 46 at distances of 90° about the center axis of the cylindrical peripheral wall portion 46a. The sector cover pieces 46b, 46b are formed to cover a part of the cylindrical accommodation recess 43 from above. The inner diameter between the pair of sector cover pieces 46b, 46b is smaller than the outer diameter across the pair of flange portions 34, 34 of the optical electronic part 31. The perpendicular distance between the ring seal 42 in a free state and the sector cover pieces 46b is smaller than the perpendicular thickness of the flange portions 34. The pair of sector cover pieces 46b, 46b, the cylindrical peripheral wall portion 46a, and the insulator 49 and the ring seal 42 which are biased upward by the cylindrical elastic seal 41 thus constitute a bayonet coupling mechanism which couples the insulating case 32 of the optical electronic part 31 to the cylindrical accommodation recess 43 of the socket 40.

More specifically, the optical electronic part 31 is put in a rotation position such that the pair of sector cover pieces 46b, 46b and the flange portions 34 do not interfere with each other. In such an orientation, the optical electronic part 31 is lowered into the cylindrical accommodation recess 43 to press down the insulator 49 while compressing the cylindrical elastic seal 41. The optical electronic part 31 is then rotated about the center axis up to the rotation position where the flange portions 34 make contact with the sector cover pieces 46b. The flange portions 34 are biased upward by the ring seal 42 with the elasticity of the cylindrical elastic seal 41 and make contact with the bottom surfaces of the sector cover pieces 46b. The optical electronic part 31 is thereby coupled to the cylindrical accommodation recess 43 of the socket 40 with the bottom surface of the insulating case 32 in elastic contact with the ring seal 42.

Figure 17:
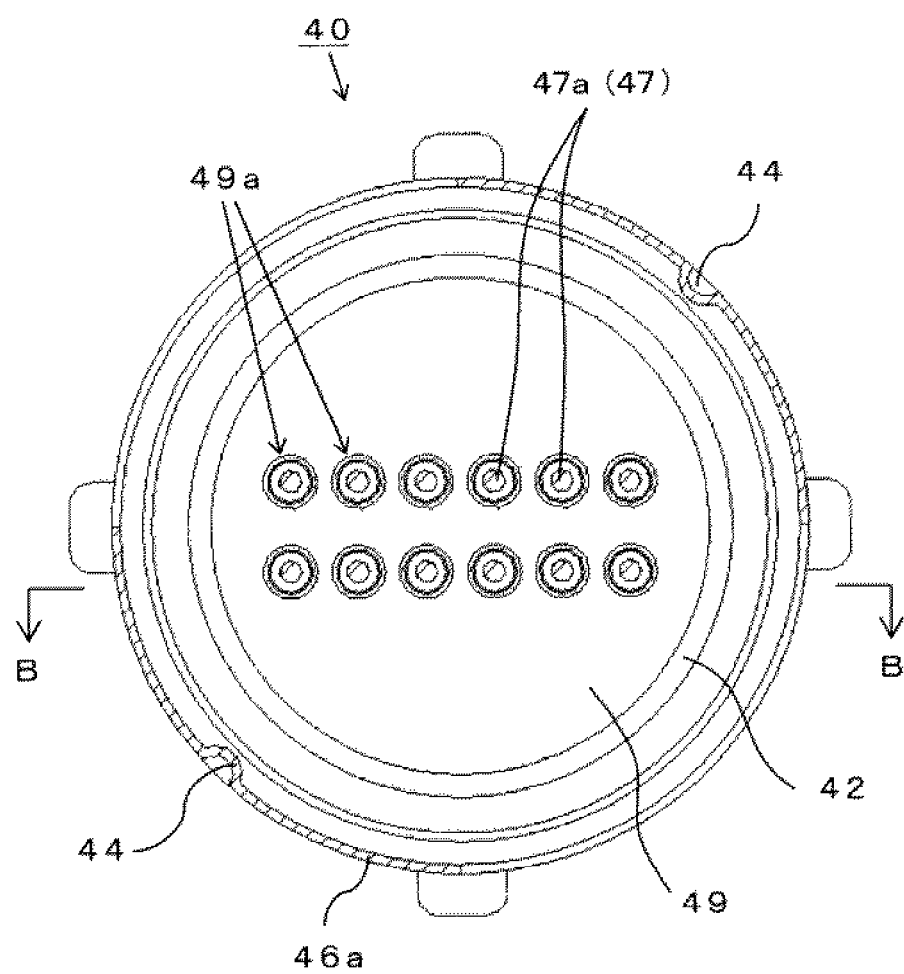
FIG. 17 is a cross-sectional view of the socket 40, taken along the line C-C of FIG. 18.

As shown in FIGS. 16 and 17, the pair of engagement protrusions 44, 44 to be engaged with the engagement recesses 34a of the flange portions 34 is formed by inwardly embossing the metal plate in the regions of the cylindrical peripheral wall portion 46 falling on the intermediate positions of the sector cover pieces 46b about the center axis. The rotation position in which the flange portions 34 make contact with the centers of the bottom surfaces of the sector cover pieces 46b is thus set as the sliding position in which the optical electronic part 31 is positioned in the direction of rotation. The large number of conductive pads 7, 7, . . . are exposed in respective portions of the bottom surface of the insulating case 32 so that, in such a sliding position, the contact portions 47a of the contacts 47 located in the cylindrical accommodation recess 43 and the corresponding conductive pads 7 come to opposite positions.

FIG. 18 shows the socket 40 mounted on the printed wiring board 120. The insulating plate 45 is arranged on the flat surface of the printed wiring board 120. The leg portions of the contacts 47 protruding downward from the insulating plate 45 are inserted through through holes of the printed wiring board 120, and soldered to a not-shown corresponding signal pattern formed around. Ground leg portions 46c, 46c bent outward along the horizontal plane in four positions at the lower end of the cylindrical peripheral wall portion 46a of the metal case 46 are soldered to a not-shown ground pattern of the printed wiring board 120.

Figure 20:
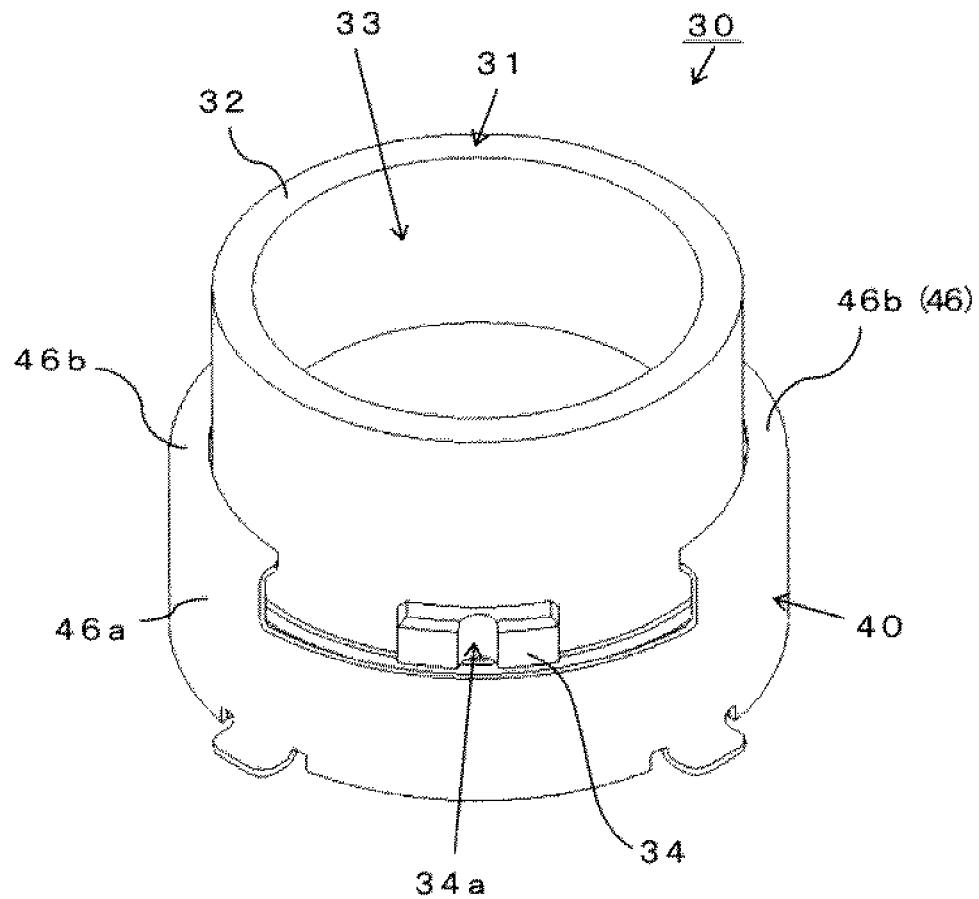
FIG. 20 is a perspective view of the connection assembly 30 including an optical electronic part and a socket, showing a state in which the optical electronic part 31 is accommodated into a cylindrical accommodation recess 43 of the socket 40 from above.
Figure 21:
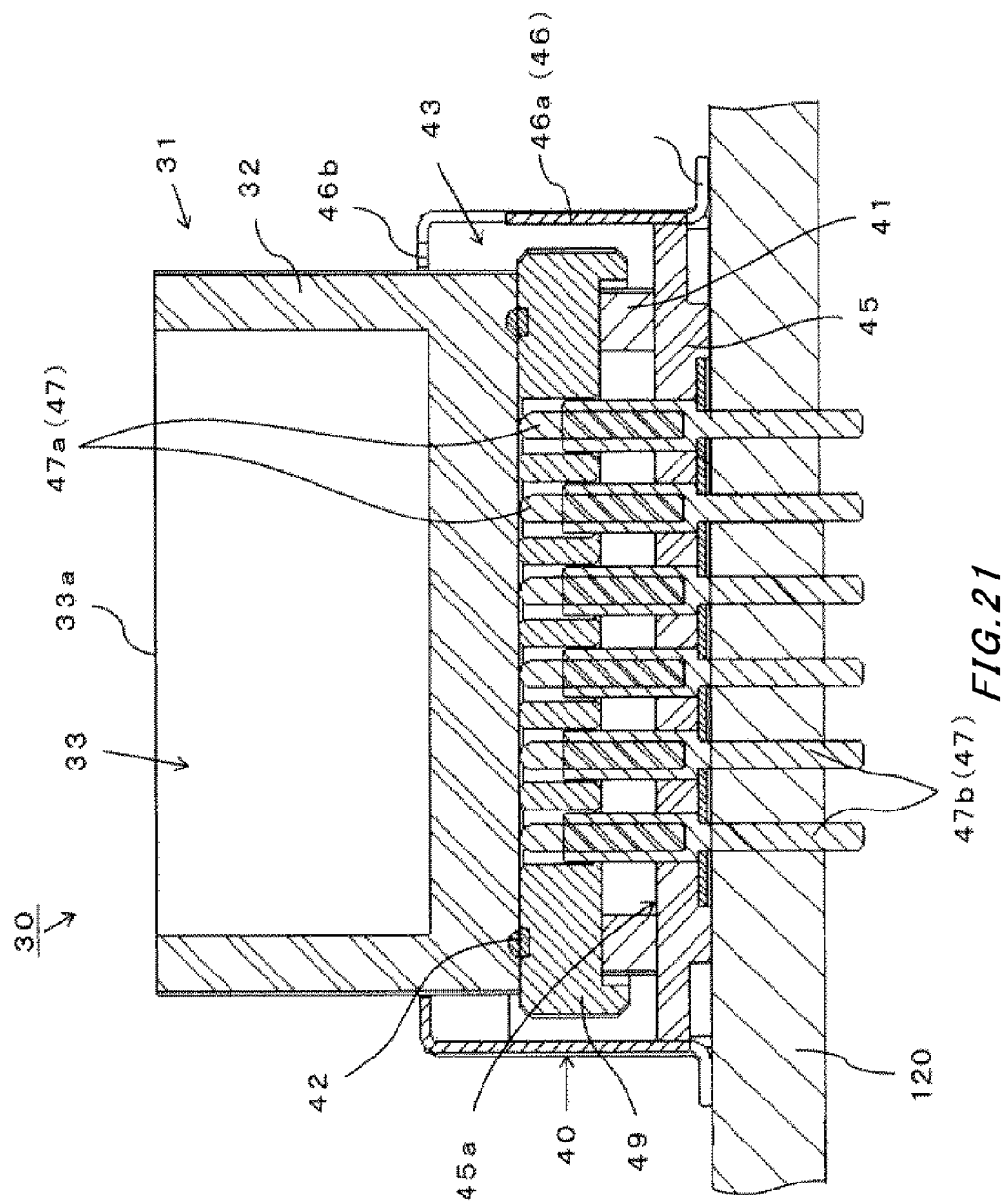
FIG. 21 is a longitudinal sectional view showing the state of FIG. 20, taken along the line B-B of FIG. 17.
Figure 22:
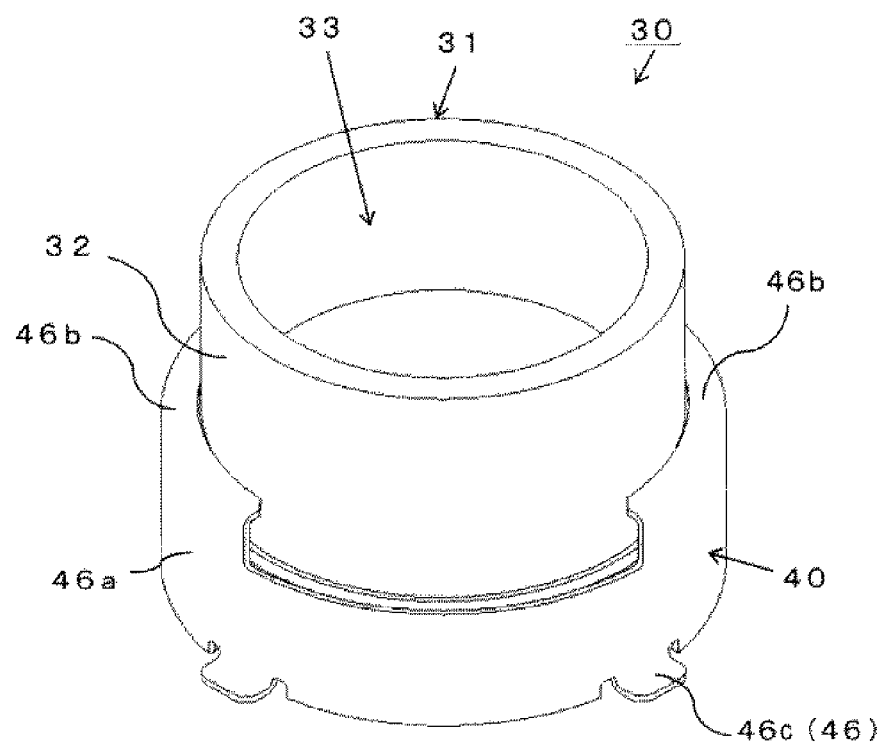
FIG. 22 is a perspective view of the connection assembly 30 including an optical electronic part and a socket, showing a state in which the optical electronic part 31 is connected to the socket 40.
Figure 23:
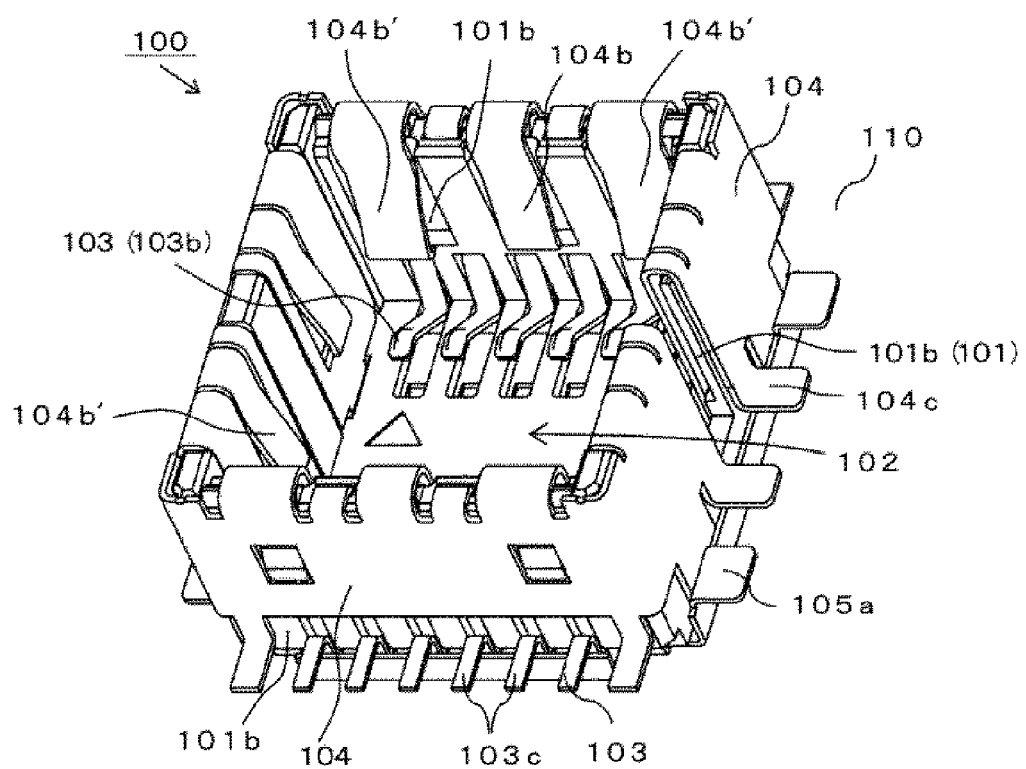
FIG. 23 is a perspective view of a conventional socket 100 to be connected with an optical electronic part.
Figure 24:
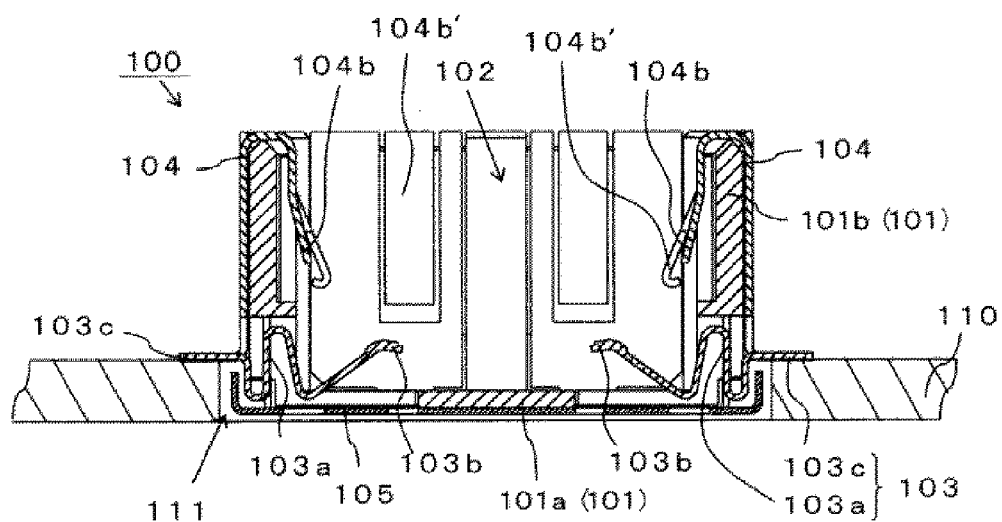
FIG. 24 is a longitudinal sectional view of the socket 100.

To connect the optical electronic part 31 to the socket 40 mounted on the printed wiring board 120, as shown in FIGS. 20 and 21, the optical electronic part 31 oriented in the rotation position in which the flange portions 34 do not overlap with the sector cover pieces 46b is inserted down into the cylindrical accommodation recess 43 of the socket 40. The bottom surface of the insulating case 32 presses down the insulator 49 to compress the cylindrical elastic seal 41. In such a state, the insulating case 32 is rotated about the center axis of the cylindrical accommodation recess 43 along the cylindrical peripheral wall portion 46a.

If the insulating case 32 is rotated to the sliding position in which the engagement protrusions 44 on the socket 40 side and the engagement recesses 34a on the optical electronic part 31 side are opposed to each other, the engagement protrusions 44 and the engagement recesses 34a are engaged with each other to restrict the rotation of the insulating case 32 about the center axis for positioning. The contact portions 47a of the corresponding contacts 47 make elastic contact from below with the large number of conductive pads 35 exposed in the bottom surface of the insulating case 32, whereby the contact portions 47a and the conductive pads 35 are electrically connected to each other.

If the operation for pressing down the optical electronic part 31 is released in this sliding position, the flange portions 34 of the insulating case 32 are biased upward by the elasticity of the cylindrical elastic seal 41 via the insulator 49. The flange portions 34 come into contact with the center positions of the bottom surfaces of the sector cover pieces 46b, whereby the socket 40 and the optical electronic part 31 are coupled. With the socket 40 and the optical electronic part 31 coupled to each other in the sliding position, the cylindrical elastic seal 41 and the ring seal 42 are compressively deformed. The ring seal 42 fixed to the flat surface of the insulator 49 is thereby elastically put into close contact with the bottom surface of the insulating case 32 surrounding the region where the conductive pads 35 are exposed. As a result, the contacting space in which the large number of conductive pads 35 and the contact portions 47a of the corresponding contacts 47 are in contact with each other is surrounded and hermetically sealed from outside by the bottom surface of the insulating case 32, an elastic seal member formed by stacking the ring seal 42, the insulator 49, and the cylindrical elastic seal 41, and the flat surface of the insulating plate 45.

If the insulating case 32 is positioned in the rotation position of the sliding position, the photoelectric conversion element built in the optical electronic part 31 is electrically connected to the signal pattern of the printed wiring board 120 via the conductive pads 35 and the contacts 47. With the optical electronic part 31 and the socket 40 connected in such a sliding position, the photoelectric conversion element built in the optical electronic part 31 faces upward in the perpendicular direction orthogonal to the flat surface of the printed wiring board 120, and photoelectrically converts an image with the imaging field of view upward.

To detach the optical electronic part 31 in connection with the socket 40, the insulating case 32 in the sliding position is rotated in either direction about the center axis against the elasticity of the engagement protrusions 44 engaged with the engagement recesses 34a. As shown in FIG. 20, if the insulating case 32 is rotated to a position in which the flange portions 34 are not covered with the sector cover pieces 46b, the cylindrical elastic seal 41 and the ring seal 42 having been compressively deformed are restored to push up the entire optical electronic part 31. The insulating case 32 protruding above the cylindrical accommodation recess 43 can thus be pulled up and detached from the socket 40. In such a manner, the optical electronic part 31 can be easily attached and detached to/from the socket 40. Various different types of optical electronic parts 31 can be easily replaced according to the intended use.

In the foregoing embodiments, the metal cover 11 and the metal case 46 are used as a part of the housings of the sockets 10 and 40. However, the housings may be made of other materials such as a synthetic resin, without necessarily using a metal plate.

The housings of the sockets are not limited to ones fixed to the flat surface of the printed wiring board as long as the housings are fixed along a horizontal plane parallel to the printed wiring board 120. Like a through-board socket, a part of a housing may be fitted to a recess of the printed wiring board.

The sockets may be connected to the printed wiring board via another connector mounted on the printed wiring board or via a connection cable.

The optical electronic parts may be modules including other functional built-in parts as long as a built-in photoelectric conversion element faces upward through an opening in a flat surface.

The present invention is suitable for a connection assembly including an optical electronic part and a socket in which a lower portion of a case shielded around is inserted into an attachment hole of a printed wiring board for attachment.

REFERENCE SIGNS LIST 1 connection assembly including optical electronic part and socket (first embodiment)
2 optical electronic part
3 insulating case
6 flange portion
7 conductive pad 10 socket
11 metal cover (housing)
12 upper elastic ring frame unit (first elastic seal member)
13 lower elastic ring frame unit (first elastic seal member)
16 insulating plate (housing)
16B connection area
17 contact
17a contact portion
18 guide wall (guide portion)
19 connection insertion recess
22 rectangular ring seal (first elastic seal member)
30 connection assembly including optical electronic part and socket (second embodiment)
31 optical electronic part
32 insulating case
34 flange portion
35 conductive pad
40 socket
41 cylindrical elastic seal (second elastic seal member)
42 ring seal (second elastic seal member)
43 cylindrical accommodation recess
45 insulating plate (circular bottom surface)
45A connection area
46 metal case (housing)
46a cylindrical peripheral wall portion
47 contact
47a contact portion
49 insulator (second elastic seal member)

The invention claimed is:

1. A connection assembly comprising an optical electronic part with a built-in photoelectric conversion element to a socket fixed to a printed wiring board, wherein:
the optical electronic part includes
an insulating case that makes the built-in photoelectric conversion element face vertically upward through an opening in a flat surface and integrally includes a flange portion protruding from a side surface at least in one direction along a horizontal plane, and
a plurality of conductive pads that are electrically connected to the photoelectric conversion element and exposed in an outer surface of the insulating case, the outer surface being parallel to the horizontal plane;
the socket includes
a housing that is fixed to the printed wiring board along a horizontal plane parallel to the printed wiring board,
a guide portion that slidably guides the flange portion along the horizontal plane, and
a plurality of contacts that are mutually insulated and fixed to a connection area of the housing perpendicularly opposed to the outer surface in which the conductive pads are exposed, leg portions on one end side of the contacts being electrically connected to a conductive pattern of the printed wiring board, leg portions on the other side of the contacts being located in movement loci of the plurality of conductive pads sliding integrally with the flange portion; and
the optical electronic part is connected to the socket fixed to the printed wiring board in an orientation such that the photoelectric conversion element faces upward orthogonally to the printed wiring board.

2. The connection assembly according to claim 1, wherein the plurality of conductive pads are exposed in any one of exposure surfaces including a flat surface and a bottom surface of the flange portion;
a connection insertion recess that slidably guides the flange portion in a protruding direction of the flange portion and accommodates the flange portion so that the connection area is opposed to the exposure surface of the flange portion is formed in the housing; and
the insulating case is horizontally positioned in an insertion position of the flange portion in which the conductive pads exposed in the exposure surface of the flange portion make contact with the contact portions of the corresponding contacts in the connection insertion recess.

3. The connection assembly according to claim 2, wherein a part of the housing forming the connection insertion recess is a metal cover electrically connected to a ground pattern of the printed wiring board.

4. The connection assembly according to claim 2, wherein a guide reception portion that guides the flange portion perpendicularly placed thereon to the connection insertion recess in the protruding direction of the flange portion is formed on the housing to be continuous with the connection insertion recess.

5. The connection assembly according to claim 2, wherein:
the socket further includes a first elastic seal member that is fixed to a region of the housing surrounding an entire periphery of the connection area and makes elastic contact with the exposure surface of the flange portion inserted into the connection insertion recess to sandwich the flange portion between an inner surface of the connection insertion recess opposed to the connection area and the first elastic seal member; and
a space in which the conductive pads exposed in the exposure surface of the flange portion and the contact portions of the corresponding contacts are in contact with each other is hermetically sealed by the housing, the first elastic seal member, and the exposure surface of the flange portion.

6. The connection assembly according to claim 1, wherein:
the plurality of conductive pads are exposed in a bottom surface of the insulating case, the insulating case having a closed-bottomed cylindrical shape with a center axis in a perpendicular direction;
a cylindrical accommodation recess accommodating the flange portion of the insulating case is formed in the housing, the cylindrical accommodation recess being formed by a circular bottom surface portion and a cylindrical peripheral wall portion erected around the circular bottom surface portion, the circular bottom surface portion having a connection area opposed to the bottom surface of the insulating case in which the conductive pads are exposed;
the flange portion is fitted and inserted into between a cover piece horizontally protruded inward from the peripheral wall portion and the circular bottom surface portion, and the insulating case is rotatably guided about the center axis of the cylindrical accommodation recess along an inner wall surface of the peripheral wall portion; and
the insulating case is positioned in a rotating direction in a rotation position of the insulating case in which the conductive pads exposed in the bottom surface of the insulating case make contact with the contact portions of the corresponding contacts in the cylindrical accommodation recess.

7. The connection assembly according to claim 6, wherein:

the peripheral wall portion and the cover piece forming the cylindrical accommodation recess are made of a single metal plate; and a leg portion at a lower end of the peripheral wall portion is electrically connected to a ground pattern of the printed wiring board.

8. The connection assembly according to claim 6, wherein:

the socket further includes a second elastic seal member that is fixed to a region of the circular bottom surface portion surrounding an entire periphery of the connection area and makes elastic contact with the bottom surface of the insulating case in the cylindrical accommodation recess to sandwich the insulating case between the cover piece and the second elastic seal member; and a space in which the conductive pads exposed in the bottom surface of the insulating case and the contact portions of the corresponding contacts are in contact with each other is hermetically sealed between the circular bottom surface portion, the second elastic seal member, and the bottom surface of the insulating case.

* * * * *